(12) United States Patent
Shigitani et al.

(10) Patent No.: US 11,353,642 B2
(45) Date of Patent: Jun. 7, 2022

(54) OPTICAL FILTER, MULTIPLEX OPTICAL FILTER, AND LIGHT EMITTING DEVICE AND ILLUMINATION SYSTEM USING THE SAME

(71) Applicant: Panasonic Intellectual Property Management Co., Ltd., Osaka (JP)

(72) Inventors: Ryosuke Shigitani, Osaka (JP); Shunpei Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/056,822

(22) PCT Filed: May 15, 2019

(86) PCT No.: PCT/JP2019/019257
§ 371 (c)(1),
(2) Date: Nov. 19, 2020

(87) PCT Pub. No.: WO2019/225423
PCT Pub. Date: Nov. 28, 2019

(65) Prior Publication Data
US 2021/0199865 A1    Jul. 1, 2021

(30) Foreign Application Priority Data

May 25, 2018  (JP) .............................. JP2018-100776
Nov. 14, 2018 (JP) .............................. JP2018-213637

(51) Int. Cl.
*G02B 5/26*    (2006.01)
*F21V 9/32*    (2018.01)
(Continued)

(52) U.S. Cl.
CPC .................. *G02B 5/26* (2013.01); *F21V 9/06* (2013.01); *F21V 9/32* (2018.02); *G02B 5/208* (2013.01)

(58) Field of Classification Search
CPC .. G02B 5/26; G02B 5/208; F21V 9/32; F21V 9/06
See application file for complete search history.

(56) References Cited

U.S. PATENT DOCUMENTS 4,632,517 A    12/1986   Asher
5,281,370 A    1/1994    Asher et al.
(Continued)

FOREIGN PATENT DOCUMENTS

JP    61-083502 A    4/1986
JP    2006-287024 A  10/2006
(Continued)

OTHER PUBLICATIONS

Extended European Search Report for corresponding EP Application No. 19807990.7 dated Jul. 9, 2021.
(Continued)

*Primary Examiner* — Mary Ellen Bowman
(74) *Attorney, Agent, or Firm* — Renner, Otto, Boisselle & Sklar, LLP

(57) ABSTRACT

An optical filter includes a colloidal crystal layer including: a plurality of particles including at least one of an inorganic material or a resin material; and a binder disposed between the plurality of particles. The optical filter reflects a part of light in the wavelength range of 300 nm or more and less than 800 nm. A multiplex optical filter includes multiple optical filters. A light emitting device includes the optical filter and a light source, and a part of primary light emitted from the light source is transmitted through the optical filter.

18 Claims, 14 Drawing Sheets

(51) Int. Cl.
*F21V 9/06* (2018.01)
*G02B 5/20* (2006.01)

(56) References Cited

U.S. PATENT DOCUMENTS

| | | | |
|---|---|---|---|
| 2011/0108779 A1* | 5/2011 | Han | G02B 1/005 252/582 |
| 2012/0293858 A1 | 11/2012 | Telfer | |
| 2015/0316694 A1 | 11/2015 | Wu | |
| 2017/0138548 A1 | 5/2017 | Kurita | |
| 2017/0361297 A1 | 12/2017 | Yamanaka et al. | |
| 2019/0105939 A1 | 4/2019 | Tashiro et al. | |

FOREIGN PATENT DOCUMENTS

| | | |
|---|---|---|
| JP | 2006-292821 A | 10/2006 |
| JP | 2007-029775 A | 2/2007 |
| JP | 2010-060617 A | 3/2010 |
| JP | 2014-086394 A | 5/2014 |
| JP | 2017-003842 A | 1/2017 |
| JP | 2017-003843 A | 1/2017 |
| JP | 2017-091866 A | 5/2017 |
| JP | 2017-219738 A | 12/2017 |
| WO | 2009/020750 A1 | 2/2009 |
| WO | 2016/186158 A1 | 11/2016 |

OTHER PUBLICATIONS

International Search Report for corresponding Application No. PCT/JP2019/019257, dated Jul. 2, 2019.
Written Opinion for corresponding Application No. PCT/JP2019/019257, dated Jul. 2, 2019.
Iwayama, Yumie et al., Optically Tunable Gelled Photonic Crystal Covering Almost the Entire Visible Lightwavelength Region, Langmuir, Jan. 18, 2003, vol. 19, pp. 977-980.

* cited by examiner

OPTICAL FILTER, MULTIPLEX OPTICAL FILTER, AND LIGHT EMITTING DEVICE AND ILLUMINATION SYSTEM USING THE SAME

TECHNICAL FIELD

The present invention relates to an optical filter, a multiplex optical filter, and a light emitting device and an illumination system using the same.

BACKGROUND ART

A filter capable of absorbing or reflecting light of a specific wavelength and passing other light has been proposed. By utilizing such a function of the filter, it has been proposed to use the filter in various applications.

Patent Literature 1 proposes a filter for cutting near infrared rays generated in a flat panel display. Specifically, Patent Literature 1 discloses a near infrared absorption filter containing resin fine particles in at least one of a hard coat layer or an adhesive layer. The resin fine particles contain at least one of a near infrared absorption dye having the maximum absorption wavelength at 800 nm to 1100 nm, a dye having the maximum absorption wavelength at 640 nm to 750 nm, or a dye having the maximum absorption wavelength at 570 nm to 600 nm.

CITATION LIST

Patent Literature

Patent Literature 1: Japanese Unexamined Patent Application Publication No. 2010-60617

SUMMARY OF INVENTION

According to Patent Literature 1, at least one of the hard coat layer or the adhesive layer has resin fine particles, and the resin fine particles contain a dye absorbing a specific wavelength, thereby enhancing the durability of the dye.

However, when an organic molecule is used as the dye, it is easily decomposed by oxygen or the like, so that a filter having sufficient durability may not be obtained. Each type of dyes has its own absorption wavelength. For this reason, if a desired wavelength is to be cut by a filter, a new dye may need to be developed, which requires time and cost.

The present invention has been made in consideration of such problems as described above, which are inherent in the prior art. An object of the present invention is to provide an optical filter and a multiplex optical filter having excellent durability and easy wavelength control, and a light emitting device and an illumination system using the same.

In order to solve the above-described problems, an optical filter according to a first aspect of the present invention includes: a colloidal crystal layer including a plurality of particles including at least one of an inorganic material or a resin material, and a binder disposed between the plurality of particles. The optical filter reflects a part of light in a wavelength range of 300 nm or more and less than 800 nm.

A multiplex optical filter according to a second aspect of the present invention includes: multiple optical filters.

A light emitting device according to a third aspect of the present invention includes: an optical filter and a light source, and the optical filter transmits a part of primary light emitted from the light source.

A light emitting device according to a fourth aspect of the present invention includes: a multiplex optical filter and a light source, and the multiplex optical filter transmits a part of primary light emitted from the light source.

An illumination system according to a fifth aspect of the present invention includes a light emitting device.

DESCRIPTION OF EMBODIMENTS

An optical filter, a multiplex optical filter, and a light emitting device and an illumination system using the same are described in detail. The dimensional ratio of the drawings is exaggerated for the sake of explanation and may differ from the actual ratio.

[Optical Filter]

Figure 1:
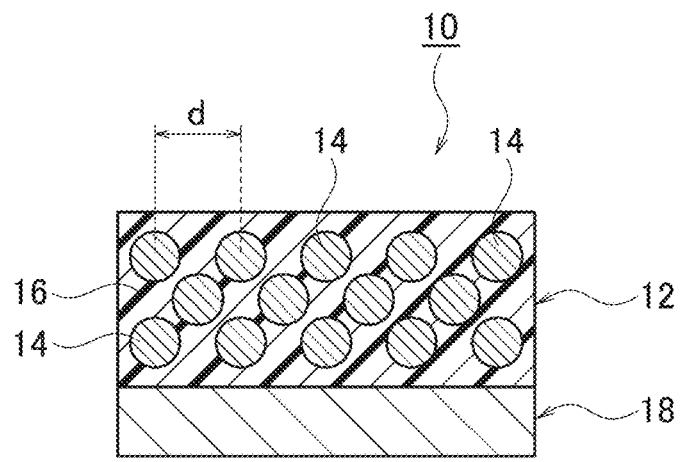
FIG. 1 is a cross-sectional view of an example of an optical filter according to a present embodiment.

As shown in FIG. 1, an optical filter 10 according to the present embodiment includes a colloidal crystal layer 12. The colloidal crystal layer 12 includes a plurality of particles 14 and a binder 16 disposed between the plurality of particles 14. In the colloidal crystal layer 12 according to the present embodiment, the particles 14 having a size of a colloidal dimension are regularly arranged in three dimensions at intervals of a center-to-center distance d of the particles 14. However, the arrangement of the particles 14 need not have a strict regularity unless the purpose according to the present embodiment is impaired.

In the present embodiment, the particles 14 may also be colloidal particles. The binder 16 may also function as a matrix of the colloidal crystal layer 12. Thus, the optical filter 10 may include a plurality of colloidal particles and a matrix which fixes the plurality of colloidal particles. In the colloidal crystal layer 12, the plurality of colloidal particles may be arranged separately from each other, and the colloidal crystal layer 12 may have a regular arrangement structure of colloidal particles.

Figure 2:
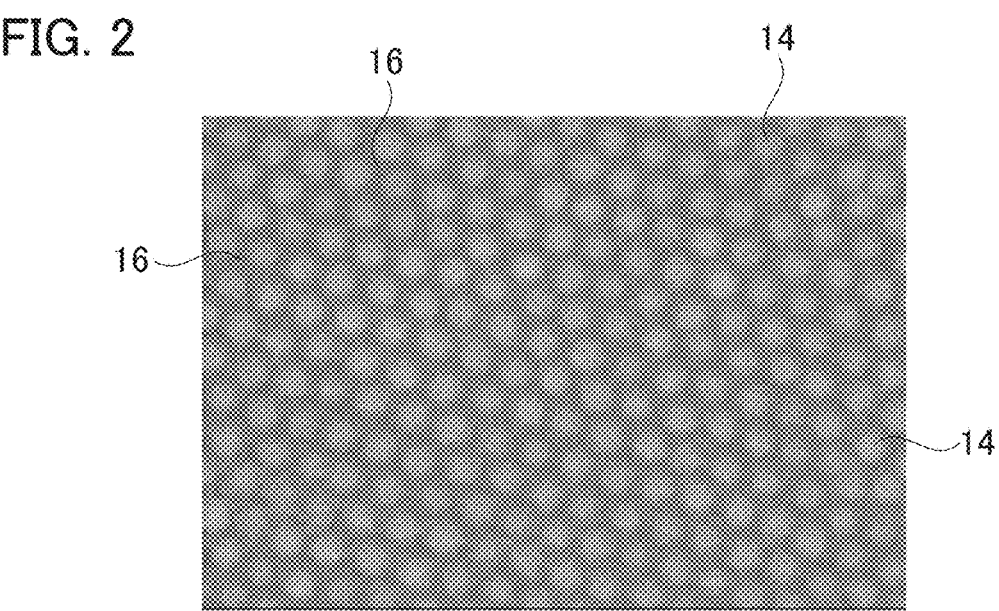
FIG. 2 is a diagram illustrating an SEM photograph of a surface of a colloidal crystal layer according to the present embodiment.
Figure 3:
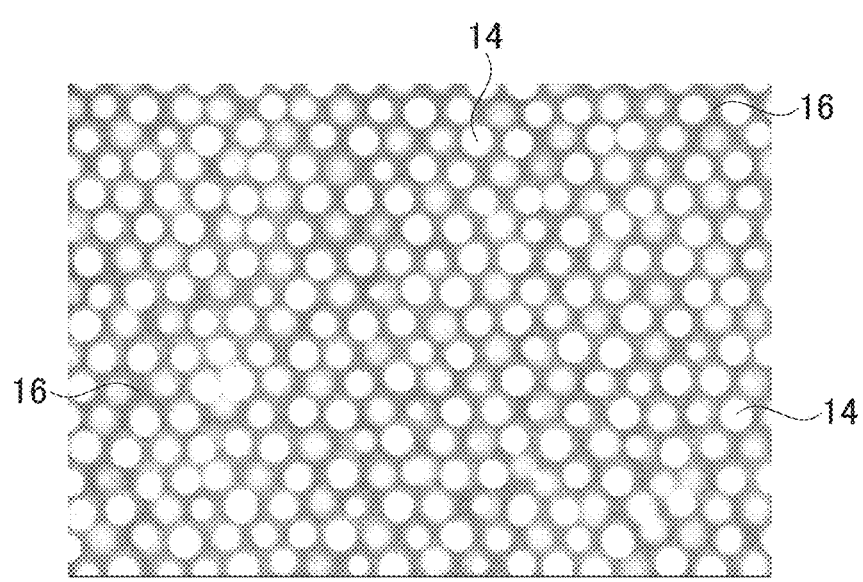
FIG. 3 is a diagram illustrating an SEM photograph of a cross-section of a colloidal crystal layer according to the present embodiment.

FIGS. 2 and 3 show an example of a scanning electron micrograph (SEM photograph) of the colloidal crystal layer 12. FIG. 2 is an SEM photograph in which a surface of the colloidal crystal layer 12 is observed, and FIG. 3 is an SEM photograph in which a cross-section of the colloidal crystal layer 12 is observed. FIGS. 2 and 3 show that the particles 14 are arranged in the binder 16 to form the colloidal crystal layer 12. In the present embodiment, by providing the colloidal crystal layer 12, it is considered that a part of light emitted to the optical filter 10 is reflected by Bragg reflection, and a part of light that is not reflected is transmitted through the optical filter 10.

Figure 4:
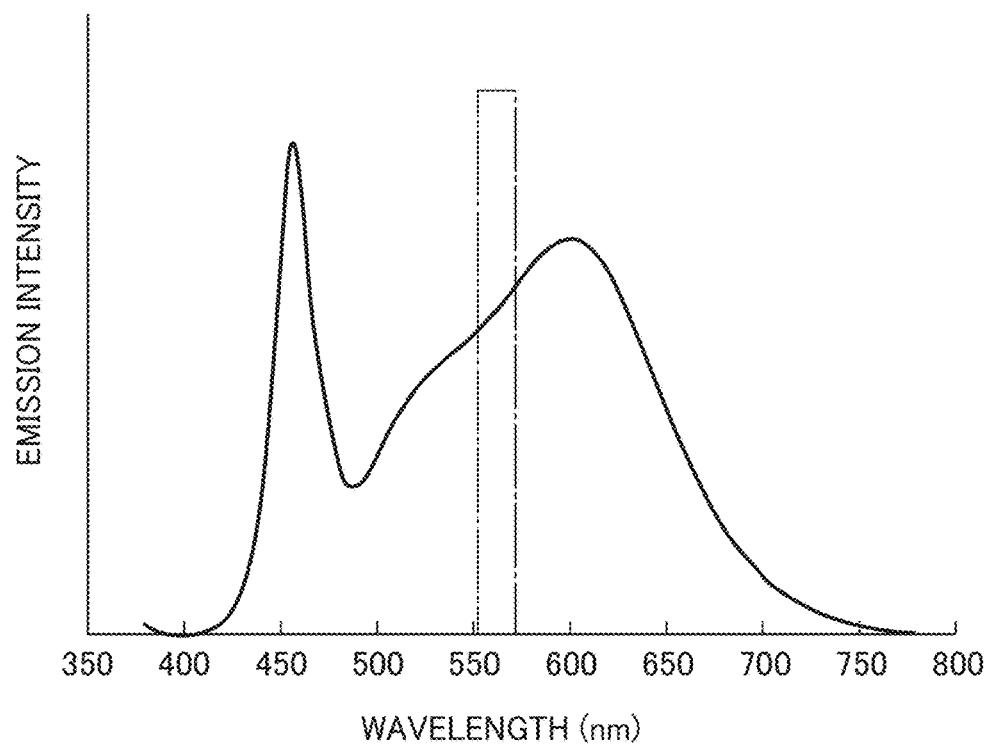
FIG. 4 is a graph illustrating an example of a spectrum of light emitted from a light source.
Figure 5:
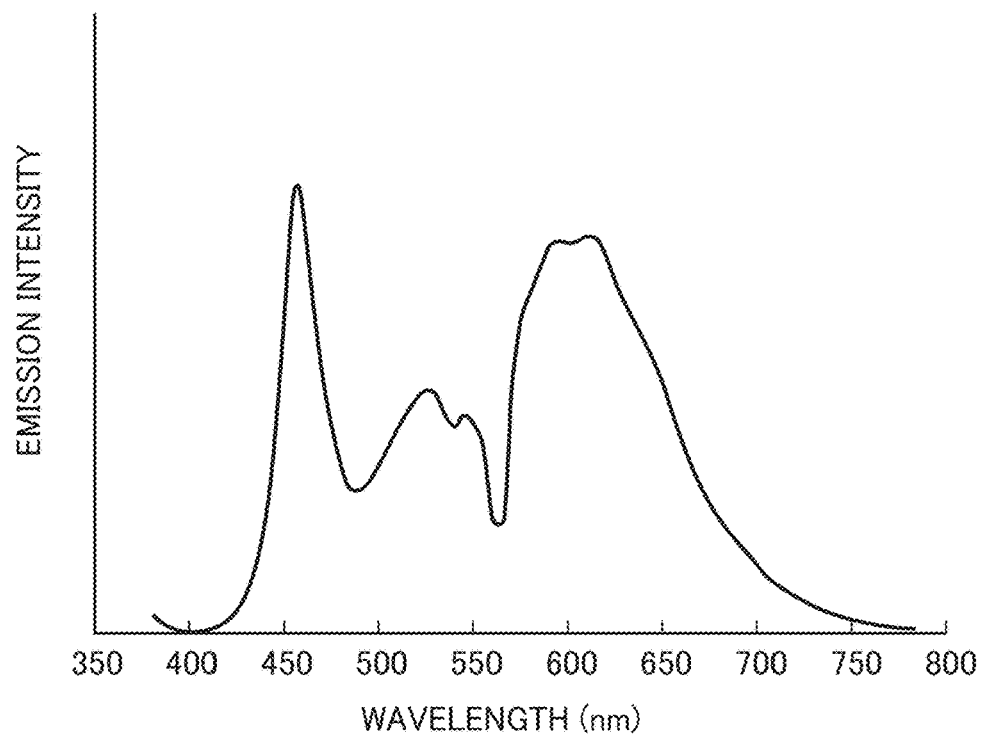
FIG. 5 is a graph illustrating an example of a transmission spectrum when light from a light source is transmitted through an optical filter.

FIG. 4 illustrates an example of a spectrum of light emitted from a light source. FIG. 5 illustrates an example of a transmission spectrum when light from the light source is transmitted through the optical filter 10 having the colloidal crystal layer 12. As can be seen from the comparison between FIGS. 4 and 5, the emission intensity of the portion surrounded by the dash-dotted line in FIG. 4 reduces in FIG. 5. This shows that the optical filter 10 reflects a part of light in the wavelength range of 300 nm or more and less than 800 nm.

As is described later, the optical filter 10 reflects an arbitrary light component by adjusting the structure of the colloidal crystal layer 12. Accordingly, the spectrum is not limited to those shown in FIGS. 4 and 5, and various spectra are shown depending on the structure of the colloidal crystal layer 12. Further, since the optical filter 10 reflects an arbitrary light component by adjusting the structure of the colloidal crystal layer 12, it is also said that it is the colloidal crystal layer 12 of the optical filter 10 that reflects a part of light in the wavelength range of 300 nm or more and less than 800 nm. The optical filter 10 may reflect a part of light in the wavelength range of 450 nm or more and less than 650 nm.

The optical filter 10 may reflect a part of light in the wavelength range of 300 nm to 500 nm, for example. When light within such a range is reflected, insects are less likely to be attracted to the light transmitted through the optical filter 10. Accordingly, the optical filter 10 is preferably used, for example, in a general light emitting device for illumination.

The optical filter 10 may reflect a part of light in the wavelength range of 470 nm to 520 nm, for example. When light within such a range is reflected, the suppression of melatonin secretion at night is reduced, and thus the disturbance of the rhythm of sleep is prevented. Accordingly, the optical filter 10 is preferably used, for example, as a general light emitting device for illumination.

The optical filter 10 may reflect a part of light in the wavelength range of 580 nm to 600 nm, for example. When light within such a range is reflected, the intensity of the yellow light component is relatively low, and the green light component and the red light component are emphasized, so that an irradiated body, such as meat, is clearly shown. Accordingly, the optical filter 10 is preferably used, for example, for a light emitting device for illuminating commodities displayed in a supermarket and the like.

The optical filter 10 may reflect a part of light in the wavelength range of 600 nm to 800 nm, for example. When light within such a range is reflected, the light intensity in the light absorption wavelength range of pigment phytochrome with respect to photoperiodism becomes low, so that effects of light damage on crops, such as delayed flowering, inhibition of ears of grain, and yield reduction, are reduced. Accordingly, the optical filter 10 is preferably used as a light emitting device for illumination adjacent to the farmland, such as a streetlight and a security light.

The optical filter 10 preferably has a maximum reflectance of 20% or more and less than 100% in the wavelength range of 300 nm or more and less than 800 nm. The optical filter 10 of present embodiment controls the wavelength and the intensity of the reflected light by adjusting the regular arrangement structure of the colloidal crystal layer 12 as described later. By reflecting a part of light in the desired wavelength range instead of reflecting all the light in a specific wavelength range as in the conventional optical interference filter, the desired light is extracted from the optical filter 10. For example, when all the light in a specific wavelength range is reflected, the light transmitted through the optical filter 10 is away from the natural white light, but by reflecting a part of the light in a desired wavelength range, the attraction of insects, for example, is reduced while maintaining the natural white light. The maximum reflectance of the optical filter 10 in the wavelength range of 300 nm or more and less than 800 nm is preferably 20% to 95%, and more preferably 20% to 80%.

Figure 6:
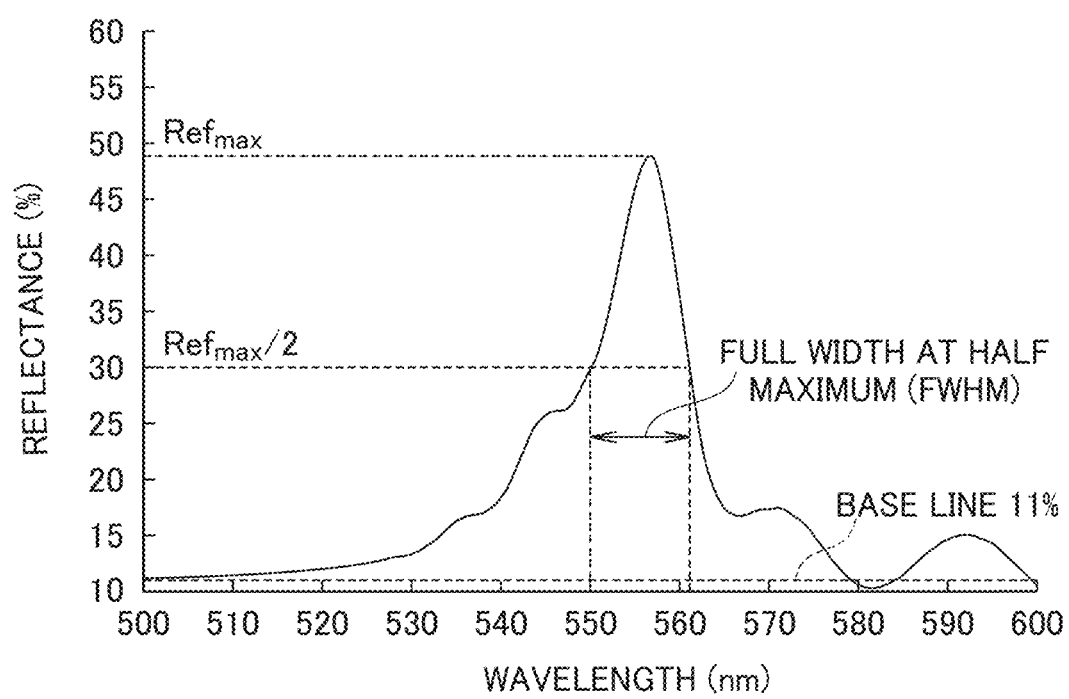
FIG. 6 is a graph for explaining a method of determining a full width at half maximum.

In the optical filter 10, preferably, a full width at half maximum of a peak of a reflection spectrum is 5 nm to 100 nm, and the peak has a maximum reflectance in the wavelength range of 300 nm or more and less than 800 nm. The full width at half maximum tends to become smaller as the variation in the layer thickness of the colloidal crystal layer 12, the arrangement of the particles 14, or the like is precisely controlled. Further, as the particle size distribution is narrower, the particles 14 are regularly arranged, so that the full width at half maximum tends to be smaller. Accordingly, from the viewpoint of productivity, the full width at half maximum is preferably 5 nm or more. Further, the full width at half maximum set to 5 nm or more tends to have desired effects, such as reducing attraction of insects. Further, the full width at half maximum set to 100 nm or less reduces the possibility that light having a wavelength used for clearly producing an irradiated body, for example, is reflected by the optical filter 10. Further, the full width at half maximum set to 100 nm or less prevents the reduction in the light emission efficiency in the light emitting device including the optical filter 10. The full width at half maximum is more preferably 10 nm to 60 nm. In the present specification, in consideration of reflection occurring on the surface of the optical filter 10, as shown in FIG. 6, the full width at half maximum (FWHM) is determined to be 11% as a baseline. In FIG. 6, $\mathrm{Ref}_{max}$ represents the reflectance at the above-described peak, and $\mathrm{Ref}_{max}/2$ represents the reflectance represented by $\mathrm{Ref}_{max}/2=(\mathrm{Ref}_{max}+11)/2$. The full width at half maximum (FWHM) is a value obtained by subtracting the smaller wavelength from the larger wavelength at the reflectance $\mathrm{Ref}_{max}/2$.

The optical filter 10 according to the present embodiment reflects an arbitrary light component by adjusting the structure of the colloidal crystal layer 12 without using a dye having an intrinsic absorption spectrum, or the like. It is thus not necessary to develop a material, such as a dye having a special absorption spectrum, for reflecting an arbitrary light component each time. The light component reflected by the optical filter 10 is controlled by the material of the particles 14, the average particle diameter of the particles 14, the material of the binder 16, the layer thickness of the colloidal crystal layer 12, the content of the particles 14 in the colloidal crystal layer 12, the center-to-center distance d of the particles 14, or the like.

The plurality of particles 14 include at least one of an inorganic material or a resin material. As described above, since the optical filter 10 can reflect an arbitrary light component without using a dye easily decomposed by oxygen or the like, the durability of the optical filter 10 is improved. The particles 14 may be formed of only an inorganic material or only a resin material. The particles 14 may be formed of both an inorganic material and a resin material.

As the inorganic material, for example, a metal, such as gold or silver, or a metal oxide, such as silica, alumina or titania, may be used. As the resin material, a styrenic resin, an acrylic resin, or the like may be used. One type of these materials may be used alone, or a combination of two or more types may be used.

The styrenic resin is obtained by polymerizing a styrenic monomer as a main component. Examples of the styrenic monomer include styrene, o-methylstyrene, m-methylstyrene, p-methylstyrene, α-methylstyrene, and p-methoxystyrene. Also mentioned are p-tert-butylstyrene, p-phenylstyrene, o-chlorostyrene, m-chlorostyrene, and p-chlorostyrene. One type of these styrenic monomers may be used alone, or a combination of two or more types may be used. In the present specification, the main component is 50% by mass or more.

The acrylic resin is obtained by polymerizing a (meth) acrylic monomer as a main component and may contain other monomer copolymerizable with a (meth) acrylic monomer. Examples of such (meth) acrylic monomers include methyl (meth) acrylate, ethyl (meth) acrylate, 2-hydroxyethyl (meth) acrylate, 2-hydroxypropyl (meth) acrylate, and cyclohexyl (meth) acrylate. Also mentioned are β-carboxyethyl (meth) acrylate, diethylene glycol di (meth) acrylate, 1,6-hexanediol di (meth) acrylate, triethylene glycol di (meth) acrylate, and tripropylene glycol di (meth) acrylate. Also mentioned are trimethylolpropane tri (meth) acrylate, pentaerythritol tri (meth) acrylate, and 1,6-hexanediol diglycidyl ether di (meth) acrylate. Also mentioned are bisphenol A diglycidyl ether di (meth) acrylate, neopentyl glycol diglycidyl ether di (meth) acrylate, dipentaerythritol hexa (meth) acrylate, and tricyclodecanyl (meth) acrylate. One type of these (meth) acrylic monomers may be used alone, or a combination of two or more types may be used. In the present specification, the (meth) acrylic monomer includes a methacrylic monomer or an acrylic monomer.

The average particle diameter of the particles 14 is generally 1 nm to 1000 nm, but is preferably 50 nm to 300 nm, and more preferably 70 nm to 280 nm. In the present specification, the average particle diameter of the particles 14 is obtained by observing the surface of the colloidal crystal layer 12 with a scanning electron microscope and measuring the particle diameters of particles 14.

The binder 16 preferably contains a resin, for example. As the binder 16, a resin having a high light transmittance in the wavelength range of 300 nm or more and less than 800 nm may be used. The resin used for the binder 16 preferably contains at least one selected from the group consisting of an acrylic resin, a polycarbonate resin, a cycloolefin resin, an epoxy resin, a silicone resin, an acryl-styrene copolymer, and a styrenic resin.

The acrylic resin is obtained by polymerizing a (meth) acrylic monomer as a main component and may contain other monomer copolymerizable with a (meth) acrylic monomer. Examples of such (meth) acrylic monomers include methyl (meth) acrylate, ethyl (meth) acrylate, 2-hydroxyethyl (meth) acrylate, 2-hydroxypropyl (meth) acrylate, and cyclohexyl (meth) acrylate. Also mentioned are β-carboxyethyl (meth) acrylate, diethylene glycol di (meth) acrylate, 1,6-hexanediol di (meth) acrylate, triethylene glycol di (meth) acrylate, and tripropylene glycol di (meth) acrylate. Also mentioned are trimethylolpropane tri (meth) acrylate, pentaerythritol tri (meth) acrylate, and 1,6-hexanediol diglycidyl ether di (meth) acrylate. Also mentioned are bisphenol A diglycidyl ether di (meth) acrylate, neopentyl glycol diglycidyl ether di (meth) acrylate, dipentaerythritol hexa (meth) acrylate, and tricyclodecanyl (meth) acrylate. One type of these (meth) acrylic monomers may be used alone, or a combination of two or more types may be used.

Examples of the polycarbonate resin include an aromatic polycarbonate polymer obtained by reacting a dihydric phenol with phosgene or a carbonic diester compound, and an aromatic polycarbonate resin which is a copolymer thereof. Also mentioned as the polycarbonate resin is an aliphatic polycarbonate resin obtained by a copolymer of carbon dioxide and an epoxide. Also mentioned as the polycarbonate resin is aromatic-aliphatic polycarbonates obtained by copolymerizing these resins. Also mentioned as copolymerization monomers of the polycarbonate resin are linear aliphatic divalent carboxylic acids and the like, such as adipic acid, pimelic acid, suberic acid, azelaic acid, sebacic acid, decanedicarboxylic acid, and the like. One type of polycarbonate resins may be used alone, or a combination of two or more types may be used.

The cycloolefin resin is a resin whose main chain includes a carbon-carbon bond and has a cyclic hydrocarbon structure in at least a part of the main chain. Examples of the cycloolefin resin include addition copolymers of ethylene and norbornene, and addition copolymers of ethylene and tetracyclododecene.

The epoxy resin is a resin obtained by curing a prepolymer containing two or more epoxy groups in one molecule with a curing agent. As the epoxy resin, for example, a bisphenol A type epoxy resin, a bisphenol F type epoxy resin, a bisphenol S type epoxy resin, a biphenyl type epoxy resin, a naphthalenediol type epoxy resin, or a phenol novolak type epoxy resin may be used. A cresol novolak epoxy resin, a bisphenol A novolak epoxy resin, a cyclic aliphatic epoxy resin, or a heterocyclic epoxy resin (triglycidyl isocyanurate, diglycidyl hydantoin, etc.) may also be used. Further, modified epoxy resins obtained by modifying these epoxy resins with various materials may be used. Halides, such as bromides or chlorides of these epoxy resins, may also be used. One type of these epoxy resins may be used alone, or a combination of two or more types may be used.

As the curing agent for curing the epoxy resin, any compound having an active group capable of reacting with an epoxy group may be used. Known epoxy curing agents may be used as appropriate, and compounds having amino groups, acid anhydride groups, or hydroxyphenyl groups are particularly suitable. Dicyandiamides and derivatives thereof, organic acid hydrazides, amine imides, aliphatic amines, aromatic amines, tertiary amines, polyamine salts, microcapsule-type curing agents, imidazole-type curing agents, acid anhydrides, and phenol novolaks are mentioned. One type of these curing agents may be used alone, or a combination of two or more types may be used.

Various curing accelerators may be used in combination with the above curing agents. Examples of the curing accelerator include a tertiary amine curing accelerator, a urea derivative curing accelerator, an imidazole curing accelerator, and a diazabicyclo undecene (DBU) curing accelerator. Also mentioned are an organophosphorus curing accelerator (for example, a phosphine-based curing accelerator or the like), and an onium salt curing accelerator (for example, a phosphonium salt-based curing accelerator, a sulfonium salt-based curing accelerator, an ammonium salt-based curing accelerator, or the like). Further mentioned are a metal chelate curing accelerator, acid and metal salt curing accelerators, and the like.

The silicone resin is a resin having a three-dimensional network structure formed by crosslinking linear polymers composed of siloxane bonds. Examples of the silicone resin include a dimethyl-based silicone having a side chain composed of, for example, a methyl group, and an aromatic-based silicone partially substituted with an aromatic-based molecule. In the present embodiment, an aromatic silicone is particularly preferred as the silicone resin.

The silicone resin may be a condensate obtained by hydrolyzing an alkoxysilane followed by dehydration condensation. Specific examples of the alkoxysilane include, triphenylethoxysilane, trimethylethoxysilane, triethylethoxysilane, triphenylmethoxysilane, triethylmethoxysilane, and ethyldimethylmethoxysilane. Also mentioned are methyldiethylmethoxysilane, ethyldimethylethoxysilane, methyldiethylethoxysilane, phenyldimethylmethoxysilane, phenyldiethylmethoxysilane, phenyldimethylethoxysilane, and phenyldiethylethoxysilane. Also mentioned are methyldiphenylmethoxysilane, ethyldiphenylmethoxysilane, methyldiphenylethoxysilane, ethyldiphenylethoxysilane, tert-butoxytrimethylsilane, and butoxytrimethylsilane. Also mentioned are vinyltrimethoxysilane, vinyltriethoxysilane, β-(3,4-epoxycyclohexyl)ethyltrimethoxysilane, γ-glycidoxypropyltrimethoxysilane, and γ-methacryloxypropyltriethoxysilane. Also mentioned are N-β(aminoethyl)γ-aminopropyltrimethoxysilane, N-β(aminoethyl)γ-aminopropyltriethoxysilane, γ-aminopropyltrimethoxysilane, and γ-aminopropyltriethoxysilane. Also mentioned are methyltriacetoxysilane, ethyltriacetoxysilane, N-s-phenyl-γ-aminopropyltrimethoxysilane, γ-chloropropyltrimethoxysilane, and 7-mercaptopropyltrimethoxysilane. Also mentioned are triethoxysilane, trimethoxysilane, triisopropoxysilane, tri-n-propoxysilane, triacetoxysilane, tetramethoxysilane, tetraethoxysilane, tetra-n-propoxysilane, and tetraisopropoxysilane. As the hydrolytic condensate of the alkoxysilane, one type may be used alone, or a combination of two or more types may be used.

The acryl-styrene copolymer is obtained by polymerizing a (meth) acrylic monomer and a styrenic monomer as a main component. The acryl-styrene copolymer may also contain other monomer copolymerizable with a (meth) acrylic monomer and a styrenic monomer. Examples of the acryl-styrene copolymer include a styrene-(meth) acrylate copolymer, a styrene-diethylaminoethyl methacrylate copolymer, and a styrene-butadiene-acrylate copolymer.

The styrenic resin is obtained by polymerizing a styrenic monomer as a main component. Examples of the styrenic monomer include styrene, o-methylstyrene, m-methylstyrene, p-methylstyrene, α-methylstyrene, and p-methoxystyrene. Also mentioned are p-tert-butylstyrene, p-phenylstyrene, o-chlorostyrene, m-chlorostyrene, and p-chlorostyrene. One type of these styrenic monomers may be used alone, or a combination of two or more types may be used.

The layer thickness of the colloidal crystal layer 12 is preferably, for example, 1 μm to 200 μm, and more preferably 10 μm to 100 μm. As the colloidal crystal layer 12 is thicker, the proportion of light reflected by the colloidal crystal layer 12 is made greater.

The ratio of the volume of the particles 14 to the total volume of the colloidal crystal layer 12 is preferably 10-60% by volume, and more preferably 20-50% by volume, for example. The ratio of the volume of the binder 16 to the total volume of the colloidal crystal layer 12 is preferably 40-90% by volume, and more preferably, 50-80% by volume, for example. With such a range, the light transmittance and the shape stability of the colloidal crystal layer 12 are improved.

The average value of the center-to-center distance d of the particles 14 is preferably 100 nm to 380 nm, more preferably 140 nm to 310 nm. By adjusting the average value of the center-to-center distance d of the particles 14, light of a desired wavelength is reflected. The average value of the center-to-center distance d of the particles 14 is obtained by observing the surface of the colloidal crystal layer 12 with a scanning electron microscope.

As shown in FIG. 1, the optical filter 10 according to the present embodiment may further include a substrate 18 that is translucent. The colloidal crystal layer 12 may be disposed above the substrate 18. The colloidal crystal layer 12 may be in contact with the surface of the substrate 18 as shown in FIG. 1, or an intervening layer (not shown) may be disposed between the colloidal crystal layer 12 and the substrate 18.

The substrate 18 preferably has a high translucency. For example, the total light transmittance of the substrate 18 is preferably 80% to 100%, and more preferably 85% to 100%. The total light transmittance is measured, for example, by a method, such as JIS K7361-1:1997 (ISO 13468-1:1996) (Plastics-Determination of the total luminous transmittance of transparent materials-Part 1: Single beam instrument).

As the substrate 18, for example, a glass plate, such as soda lime glass, low alkali borosilicate glass, or non-alkali aluminoborosilicate glass, may be used. A resin plate, such as polycarbonate, the above-mentioned acrylic resin, or polyethylene terephthalate, may also be used.

The shape of the substrate 18 is not limited, but may be a film, for example. The thickness of the optical filter 10 is not limited, but is preferably 10 m to 5000 μm, more preferably 1000 μm to 3000 μm.

The shape of the optical filter 10 is not limited but may be a film, for example. The thickness of the optical filter 10 is not limited but is preferably 10 m to 5000 μm, more preferably 1000 μm to 3000 μm. The shape of the outermost surface of the optical filter 10 is not limited but may be smooth or may have a fine uneven shape due to the particles 14.

As described above, the optical filter 10 according to the present embodiment includes the colloidal crystal layer 12 including the plurality of particles 14 including at least one of an inorganic material or a resin material, and the binder 16 disposed between the plurality of particles 14. The optical filter 10 reflects apart of light in the wavelength range of 300 nm or more and less than 800 nm.

Since the wavelength of light transmitted through the optical filter 10 is controlled by the colloidal crystal layer 12, the optical filter 10 is not required to have an organic dye made of an organic molecule or the like that is easily decomposed by light, oxygen or the like, and thus has excellent durability. The optical filter 10 easily controls the wavelength of light transmitted through the optical filter 10 by the thickness of the colloidal crystal layer 12, the content of the particles 14 in the colloidal crystal layer 12, and the center-to-center distance d of the particles 14. Accordingly, the optical filter 10 according to the present embodiment has excellent durability and is easy to control wavelength.

Next, a method of manufacturing the optical filter 10 is described. The method of manufacturing the optical filter 10 according to the present embodiment is not limited as long as the colloidal crystal layer 12 is formed. Specifically, the particles 14 are dispersed in the raw material of the binder 16, such as the above-described (meth) acrylic monomer, and the obtained dispersion liquid is applied to the substrate 18 or the like and cured, so that the optical filter 10 is manufactured.

The method for applying the dispersion liquid is not limited, but for example, a spray coating method, a spin coating method, a slit coating method, a roll coating method, or the like may be used. The method for polymerizing the monomer is not limited, but the monomer may be polymerized by heating or by an active energy ray, such as electromagnetic wave, ultraviolet ray, visible ray, infrared ray, electron beam, gamma ray. When the monomer is polymerized by an active energy ray, a photopolymerization initiator or the like may be added to the dispersion liquid. As the photopolymerization initiator, a known photopolymerization initiator, such as a radical photopolymerization initiator, a cationic photopolymerization initiator, or an anionic photopolymerization initiator, may be used.

When a special dye requiring a special manufacturing apparatus is used, it is difficult to mass-produce the dye and the cost tends to be high. However, since the optical filter 10 according to the present embodiment controls the wavelength by adjusting the structure of the colloidal crystal layer 12, the wavelength may be easily controlled without using a dye. Moreover, the optical filter 10 is manufactured by a relatively simple facility and method, since there is less need to have a multilayer structure such as an optical interference filter. Accordingly, the optical filter 10 is also suitable for industrial productivity, such as high-mix low-volume production.

[Multiplex Optical Filter]

Next, the multiplex optical filter according to the present embodiment is described in detail with reference to the drawings. The same components as those of the above-described optical filter are denoted by the same reference numerals, and duplicate descriptions are omitted.

As described above, the optical filter 10 according to the present embodiment includes the colloidal crystal layer 12 including the plurality of particles 14 and the binder 16 disposed between the plurality of particles 14. By adjusting the arrangement structure of the particles 14 in the colloidal crystal layer 12, the optical filter 10 reflects a specific light component while transmitting light that is not reflected. This enables the optical filter 10 to emit light having a desired spectrum.

Here, in the optical filter 10, when the colloidal crystal layer 12 is thickened to increase the reflectance of a specific light component, the self-organization of the colloidal particles becomes difficult, and thus a regular arrangement structure of the colloidal particles may not be formed. When the regular arrangement structure by the colloidal particles is not formed, it becomes difficult to obtain desired reflection characteristics.

Figure 7A:
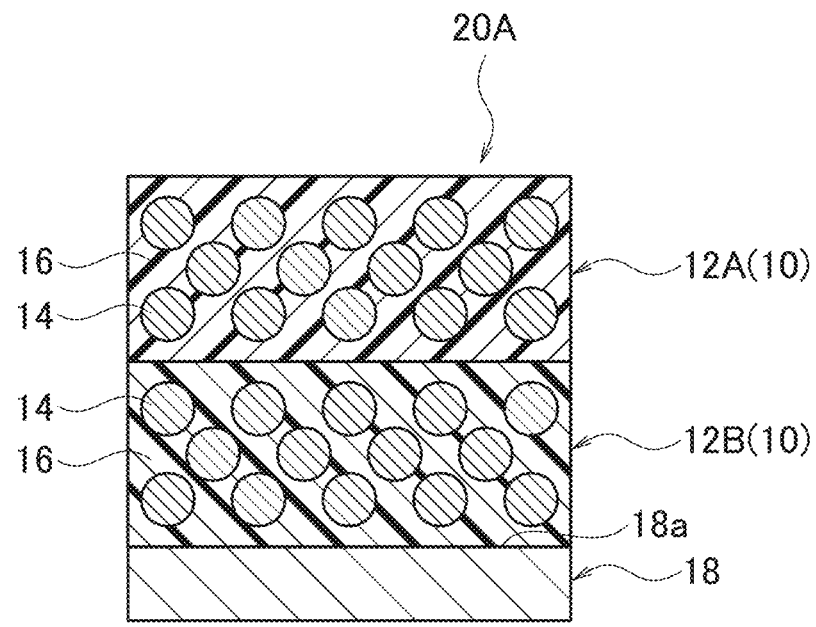
FIG. 7A is a cross-sectional view of an example of a multiplex optical filter according to the present embodiment.
Figure 7B:
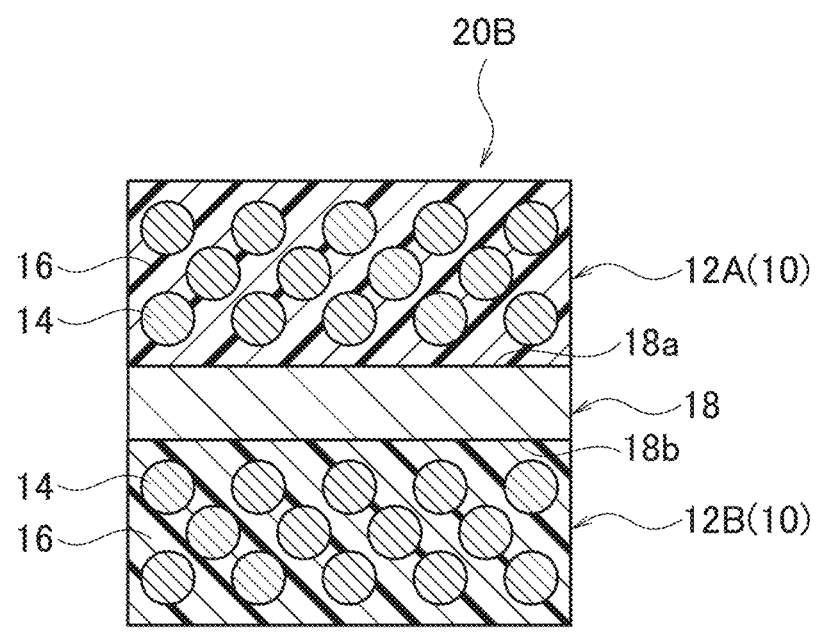
FIG. 7B is a cross-sectional view of an example of a multiplex optical filter according to the present embodiment.
Figure 7C:
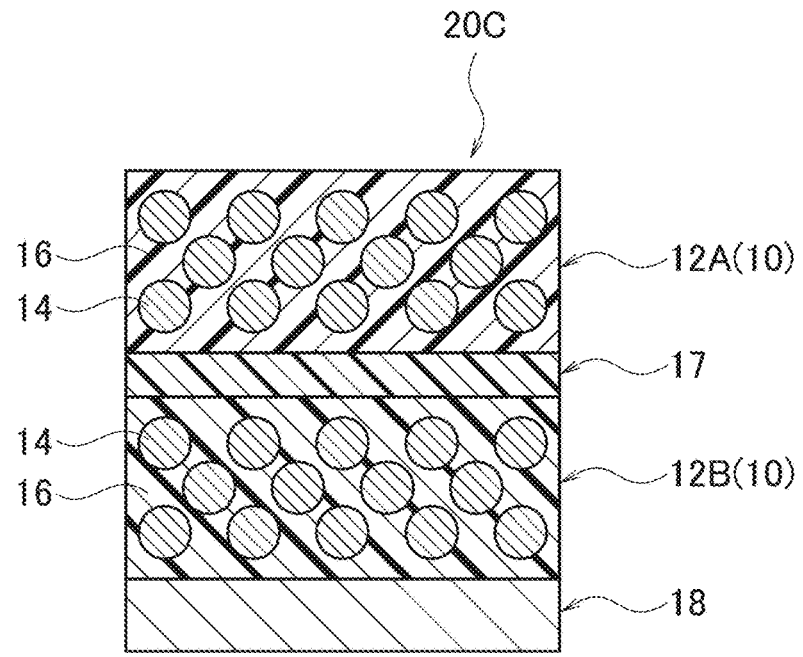
FIG. 7C is a cross-sectional view of an example of a multiplex optical filter according to the present embodiment.

Accordingly, the present embodiment is characterized in that multiple colloidal crystal layers are stacked, each including at least separated colloidal particles and a binder which fixes the individual colloidal particles. Specifically, as shown in FIGS. 7A to 7C, multiplex optical filters 20A, 20B, and 20C each include multiple optical filters 10 each made of the colloidal crystal layer 12, and the multiple optical filters 10 are stacked. As described above, the optical filter 10 has a desired reflection characteristic, and thus stacking of the optical filters 10 provides a filter having a high reflectance (for example, 50% or more) that cannot be obtained with a single layer of thick film structure. Further, stacking of the optical filters 10 having different regular arrangement structures from each other provides a filter that reflects light of multiple wavelengths.

In the multiplex optical filter 20 according to the present embodiment, the multiple stacked optical filters 10 (colloidal crystal layers 12) may have different reflection characteristics from each other. That is, regarding the multiplex optical filter, in two optical filters 10 selected from the multiple optical filters 10, the difference between the peak wavelength of the reflection spectrum of one optical filter and the peak wavelength of the reflection spectrum of the other optical filter preferably exceeds 10 nm.

Specifically, in the multiplex optical filter 20A shown in FIG. 7A, the colloidal crystal layer 12A and the colloidal crystal layer 12B preferably have different regular arrangement structures from each other. The difference between the peak wavelength of the reflection spectrum of the colloidal crystal layer 12A and the peak wavelength of the reflection spectrum of the colloidal crystal layer 12B is preferably more than 10 nm. Accordingly, the multiplex optical filter 20A has both the reflection characteristic of the colloidal crystal layer 12A and the reflection characteristic of the colloidal crystal layer 12B, so that a filter that easily diversifies the reflection characteristic is obtained. Further, the colloidal crystal layer 12A and the colloidal crystal layer 12B have different reflection characteristics from each other, so that the multiplex optical filter 20A that reflects light of two wavelengths is obtained.

In the multiplex optical filter 20 according to the present embodiment, multiple stacked optical filters 10 (colloidal crystal layers 12) may have substantially equal reflection characteristics. That is, regarding the multiplex optical filter, in two optical filters 10 selected from the multiple optical filters 10, the difference between the peak wavelength of the reflection spectrum of one optical filter and the peak wavelength of the reflection spectrum of the other optical filter is preferably 10 nm or less.

Specifically, in the multiplex optical filter 20A shown in FIG. 7A, the colloidal crystal layer 12A and the colloidal crystal layer 12B preferably have almost the same regular arrangement structure. The difference between the peak wavelength of the reflection spectrum of the colloidal crystal layer 12A and the peak wavelength of the reflection spectrum of the colloidal crystal layer 12B is preferably 10 nm or less. Accordingly, in the multiplex optical filter 20A, the reflection characteristic of the colloidal crystal layer 12A and the reflection characteristic of the colloidal crystal layer 12B are almost the same, so that a filter with enhanced reflectance is obtained. In two optical filters 10 selected from the multiple optical filters 10, the difference between the peak wavelength of the reflection spectrum of one optical filter and the peak wavelength of the reflection spectrum of the other optical filter is more preferably 5 nm or less.

As shown in FIG. 7A, the multiplex optical filter 20A according to the present embodiment may further include a substrate 18 that is translucent. The multiple optical filters 10 are preferably disposed above the substrate 18. This increases the strength of the multiplex optical filter 20A and thus improves ease of handling of the multiplex optical filter 20A. When the substrate 18 is provided with multiple colloidal crystal layers 12 A and 12 B (optical filters 10) and the colloidal crystal layers 12A and 12B are covered with a protective film, the protective film may be provided only on one surface 18a side in the structure shown in FIG. 7A. Accordingly, the manufacturing process of the multiplex optical filter 20A is simplified.

As described above, in the multiplex optical filter 20A according to the present embodiment, multiple optical filters 10 (colloidal crystal layers 12A and 12B) may be provided only on the one surface 18a of the substrate 18. However, the present embodiment is not limited to such a mode, and as shown in FIG. 7B, the optical filter 10 may be provided on both the one surface 18a of the substrate 18 and the other surface 18b opposite to the surface 18a. As described above, the multiplex optical filter 20B has both surfaces of the substrate 18 provided with multiple optical filter 10. This increases the strength of the multiplex optical filter 20B and improves ease of handling. One surface 18a and the other surface 18b of the substrate 18 are both flat surfaces. Accordingly, in the colloidal crystal layers 12A and 12B respectively provided on the flat surfaces 18a and 18b, the particles 14 easily form a regular arrangement structure, which enhances the reflectance of desired light. Further, the linear expansion coefficients of the colloidal crystal layers 12A and 12B are almost equal by using common materials for the colloidal crystal layers 12A and 12B. Accordingly, provision of the optical filters 10 (colloidal crystal layers 12A and 12B) on both the surface 18a and the surface 18b of the substrate 18 prevents warpage of the multiplex optical filter 20B.

In the multiplex optical filter according to the present embodiment, as shown in FIG. 7A, the colloidal crystal layer 12B may be directly stacked on one surface 18a of the substrate 18, and further the colloidal crystal layer 12A may be directly stacked on the colloidal crystal layer 12B on a side opposite to the substrate 18. However, the present embodiment is not limited to such an embodiment, and as shown in FIG. 7C, an adhesive layer 17 may be provided between the adjacent optical filters 10, that is, between the colloidal crystal layer 12A and the colloidal crystal layer 12B. This enhances the adhesion between the optical filters 10 and prevents the peeling of the optical filters 10. Although not shown, the adhesive layer 17 may be provided between the colloidal crystal layer 12B and the substrate 18.

The material constituting the adhesive layer 17 is not limited. It is preferable to use a material having a refractive index close to that of the binder 16 of the colloidal crystal layer constituting the optical filter 10. This prevents Fresnel reflection between the optical filter 10 and the adhesive layer 17 and enhances the transmittance of light of a specific wavelength. For example, an acrylic adhesive containing an acrylic resin may be used as the adhesive layer.

As described above, the multiplex optical filter 20 according to the present embodiment includes multiple optical filters 10. Accordingly, the multiplex optical filter is not limited to the configuration with the optical filters 10 in two layers shown in FIGS. 7A to 7C but may be a configuration with the optical filters 10 in three layers (colloidal crystal layers 12A, 12B, and 12C) shown in FIGS. 8A to 8C. Although not shown, the multiplex optical filter may have four or more optical filters 10.

Figure 8A:
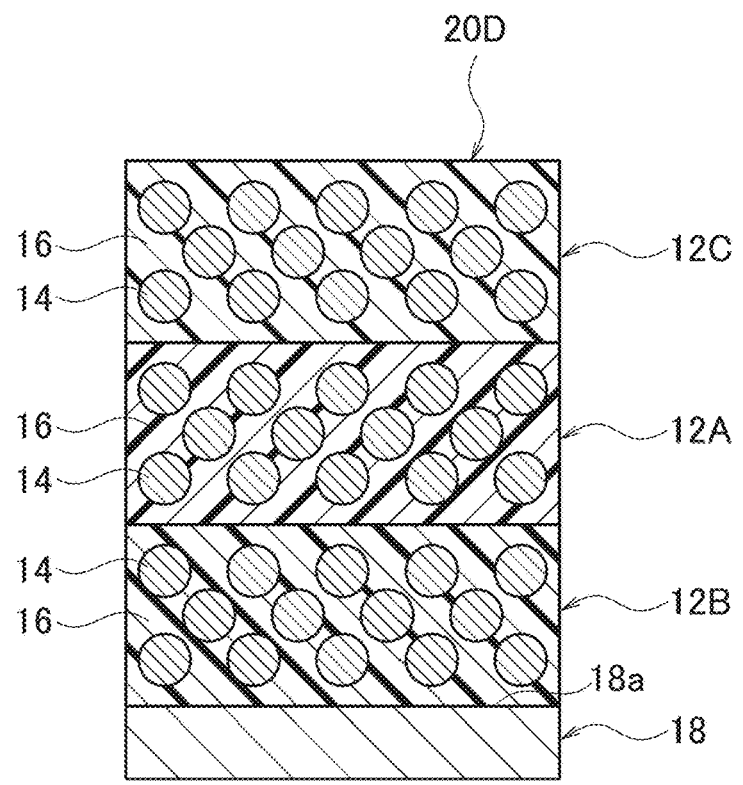
FIG. 8A is a cross-sectional view of an example of a multiplex optical filter according to the present embodiment.

Specifically, as shown in FIG. 8A, a multiplex optical filter 20D has one surface 18a of the substrate 18 stacked with the colloidal crystal layers 12A, 12B, and 12C. In FIG. 8A, no adhesive layer is provided between the colloidal crystal layer 12A and the colloidal crystal layer 12B, and between the colloidal crystal layer 12A and the colloidal crystal layer 12C, and the colloidal crystal layers come into contact with each other. The colloidal crystal layers 12A, 12B, 12C may have different reflection characteristics from each other or may have substantially the same reflection characteristics.

Figure 8B:
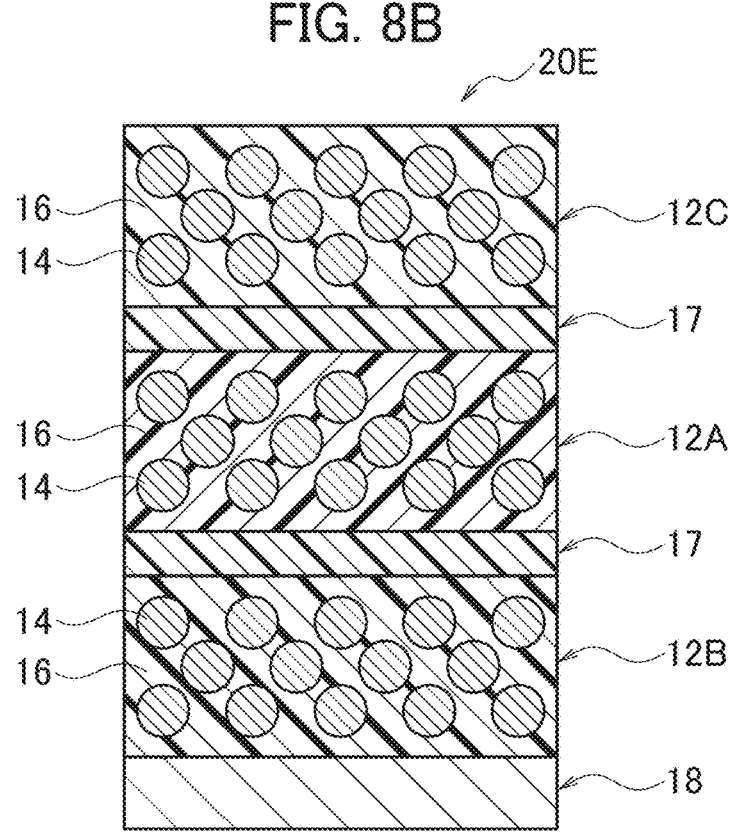
FIG. 8B is a cross-sectional view of an example of a multiplex optical filter according to the present embodiment.
Figure 8C:
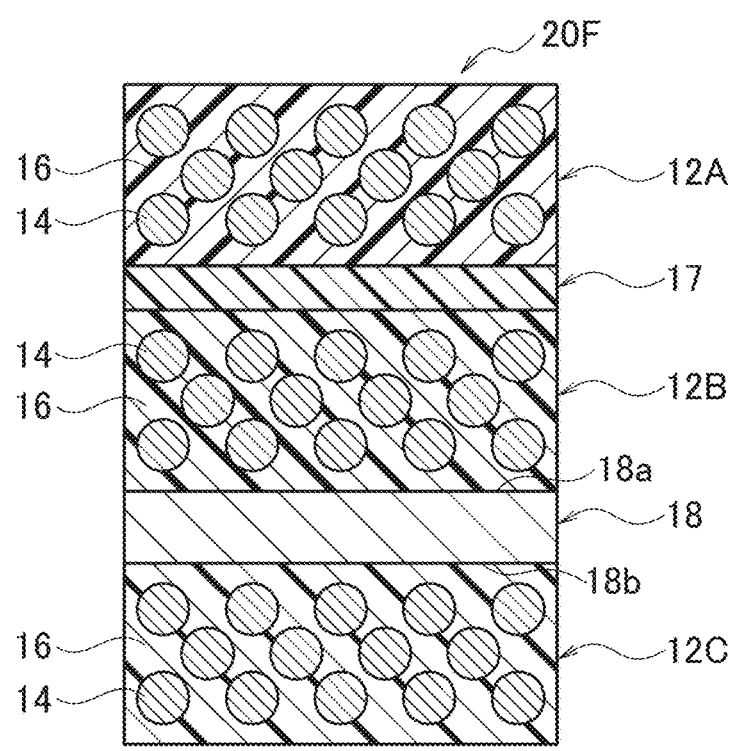
FIG. 8C is a cross-sectional view of an example of a multiplex optical filter according to the present embodiment.

As shown in FIG. 8B, a multiplex optical filter 20E includes the colloidal crystal layers 12A, 12B, 12C, and an adhesive layer 17 is provided between the colloidal crystal layer 12A and the colloidal crystal layer 12B and between the colloidal crystal layer 12A and the colloidal crystal layer 12C. Further, as shown in FIG. 8C, a multiplex optical filter 20F has one surface 18a of the substrate 18 stacked with the colloidal crystal layers 12A, 12B and the other surface 18b stacked with the colloidal crystal layer 12C. In FIG. 8C, the adhesive layer 17 is interposed between the colloidal crystal layer 12A and the colloidal crystal layer 12B, but the present embodiment is not limited to such an embodiment, and the adhesive layer 17 may not be interposed therebetween.

The reflection spectrum of the multiplex optical filter 20 according to the present embodiment preferably has two or more peaks, each of which has a maximum reflectance of 20% or more and less than 100%, in the wavelength range of 300 nm or more and less than 800 nm. The multiplex optical filter 20 controls the wavelength and intensity of the reflected light by adjusting the regular arrangement structure of the optical filters 10 (colloidal crystal layers). The multiplex optical filter 20 reflects a part of light in a specific wavelength range and thus extracts the desired light from the optical filters 10. Accordingly, the multiplex optical filter 20 has two or more of the above-described peaks, preventing the deviation of the color temperature caused when the light having an unnecessary wavelength is cut.

That is, when only one peak is in the reflection spectrum of the optical filter 10, light in one wavelength range is reflected and the remaining light is transmitted as shown in FIGS. 4 and 5. When light in one wavelength range is cut as shown in FIG. 5, a color shift may occur between the light emitted to the optical filter 10 and the light transmitted through the optical filter 10, and the color temperature may change. In contrast, when two or more of the peaks are in the reflection spectrum of the multiplex optical filter 20, light in two wavelength ranges is cut, thus preventing the color temperature deviation as compared to the case with the optical filter 10.

In the multiplex optical filter 20 according to the present embodiment, the full width at half maximum of the peak of the reflection spectrum is preferably 5 nm to 100 nm. By setting the full width at half maximum to 5 nm or more, the desired effect described above tends to be easily obtained.

Further, by setting the full width at half maximum to 100 nm or less, the possibility of reflection of light having a wavelength required, for example, for producing a clear irradiation body is reduced. Further, by setting the full width at half maximum to 100 nm or less, reduction of the light emission efficiency is prevented in the light emitting device provided with the multiplex optical filter 20. The full width at half maximum of the peak of the reflection spectrum in the multiplex optical filter 20 is obtained in the same manner as the full width at half maximum of the peak of the reflection spectrum in the optical filter 10.

Next, a method of manufacturing the multiplex optical filter 20 is described. In the method of manufacturing the multiplex optical filter 20 according to the present embodiment, similarly to the method of manufacturing the optical filter 10, particles 14 are first dispersed in the raw material of the binder 16, and the obtained dispersion liquid is applied to the substrate 18 or the like and cured. Next, the dispersion liquid is further applied to the surface of the obtained optical filter 10 and cured to obtain a multiplex optical filter 20.

For example, in the multiplex optical filter 20A shown in FIG. 7A, a filter in which the colloidal crystal layer 12A and the colloidal crystal layer 12B have almost the same regular arrangement structure is obtained as follows. First, a first dispersion liquid is prepared by dispersing the particles 14 in the raw material of the binder 16. Next, the obtained first dispersion liquid is applied to the substrate 18 and cured to obtain the colloidal crystal layer 12B. Next, the first dispersion liquid is applied on the surface of the colloidal crystal layer 12B and cured to obtain the colloidal crystal layer 12A.

In the multiplex optical filter 20A shown in FIG. 7A, a filter in which the colloidal crystal layer 12A and the colloidal crystal layer 12B have different regular arrangement structures from each other is obtained as follows. First, a first dispersion liquid is prepared by dispersing particles in a raw material of a binder. Similarly, a second dispersion liquid is prepared by dispersing particles in a raw material of a binder. In this case, it is preferable that the first dispersion liquid and the second dispersion liquid differ in at least one of the raw material of the binder, the material of the particles, the concentration of the particles, or the average particle size of the particles. The first dispersion liquid is applied to the substrate 18 and cured to obtain the colloidal crystal layer 12B. Next, the second dispersion liquid is applied to the surface of the colloidal crystal layer 12B and cured to obtain the colloidal crystal layer 12A.

As described above, the multiplex optical filter 20 according to the present embodiment includes multiple optical filters 10. This provides a filter having a high reflectance that cannot be obtained with a single layer of thick film structure. Further, stacking of the optical filters 10 having different regular arrangement structures from each other provides a filter that reflects light of multiple wavelengths.

Further, an optical filter with a simple stack of multiple conventional thin film filters has Fresnel reflection caused on the surface of the filter of the outermost layer and on the interface of each filter. This improves the reflectance of a specific wavelength but greatly reduces the transmittance of other wavelengths. In contrast, the multiplex optical filter 20 according to the present embodiment is prepared by repeating the step of applying and curing a dispersion liquid obtained by dispersing particles in a raw material of a binder, thus greatly reducing Fresnel reflection at each interface of the optical filters 10. Further, Fresnel reflection is further reduced by using resins having approximate refractive indices as the binder 16 in each optical filter 10.

[Light Emitting Device]

Next, a light emitting device 30 according to the present embodiment is described. The light emitting device 30 according to the present embodiment includes an optical filter 10 and light sources 31, and a part of primary light L1 emitted from the light sources 31 passes through the optical filter 10. The light emitting device 30 according to the present embodiment includes a multiplex optical filter 20 and light sources 31, and a part of primary light L1 emitted from the light sources 31 passes through the multiplex optical filter 20. Provided with at least one of the optical filter 10 or the multiplex optical filter 20, the light emitting device 30 reflects light of a specific wavelength and emits a desired light component.

Figure 9:
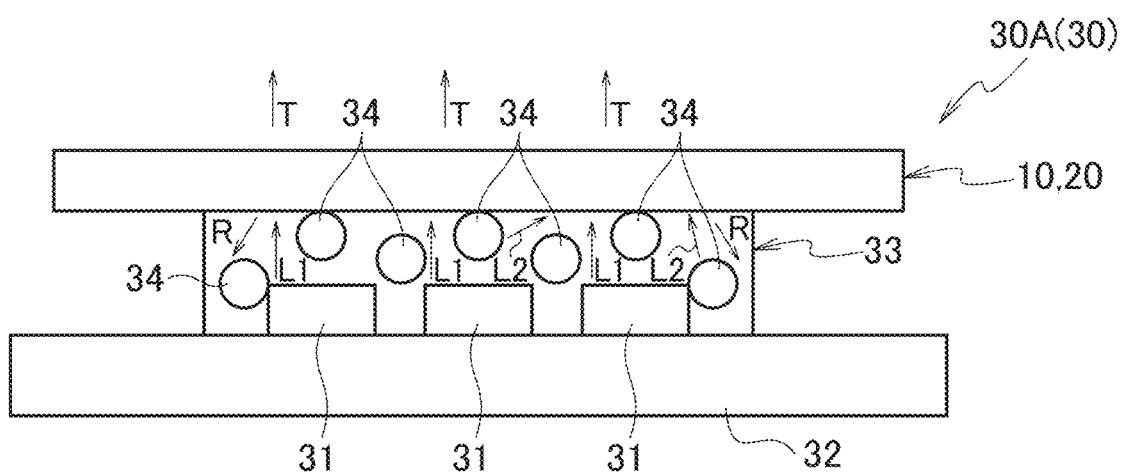
FIG. 9 is a cross-sectional view of an example of a light emitting device according to the present embodiment.

FIG. 9 shows an LED module 30A (Light-emitting diode module) as an example of the light emitting device 30. In the present embodiment, the light sources 31 each include an LED element and are a light emitting element mounted on a circuit board 32, but the present embodiment is not limited thereto.

As the light emitting element, for example, a blue LED element emitting blue light or a purple LED element emitting purple light that have a main light emitting peak in the wavelength range of 380 nm to 500 nm may be used. Examples of such light emitting elements include gallium nitride-based LED elements.

As shown in FIG. 9, the LED module 30A may further include a wavelength conversion member 33. That is, the light emitting device 30 may further include the wavelength conversion member 33. In the present embodiment, the wavelength conversion member 33 covers the light sources 31. The wavelength conversion member 33 contains at least one or more kinds of phosphors 34, such as a blue phosphor, a green phosphor, a yellow phosphor, or a red phosphor, in a translucent material, such as a silicone resin. The blue phosphor is excited by the light emitted from the light source 31 to emit blue light. The green phosphor and the yellow phosphor are also excited by the light emitted from the light source 31 to emit green light and yellow light, respectively.

The blue phosphor has the emission peak in the wavelength range of 470 nm to 500 nm, the green phosphor has the emission peak in the wavelength range of 500 nm to 540 nm, and the yellow phosphor has the emission peak in the wavelength range of 545 nm to 595 nm. Examples of the blue phosphor include $BaMgAl_{10}O_{10}:Eu^{2+}$, $CaMgSi_2O_6:Eu^{2+}$, $Ba_3MgSi_2O_8:Eu^{2+}$, and $Sr_{10}(PO_4)_6Cl_2:Eu^{2+}$. Examples of the green phosphor include $(Ba,Sr)_2SiO_4:Eu^{2+}$, $Ca_8Mg(SiO_4)_4Cl_2:Eu^{2+}$, $Ca_8Mg(SiO_4)_4Cl_2:Eu^{2+}$, $Mn^{2+}$. Examples of the yellow phosphor include $(Sr,Ba)_2SiO_4:Eu^{2+}$, $(Y,Gd)_3Al_5O_{12}:Ce^{3+}$, and $\alpha$-Ca—SiAlON:$Eu^{2+}$.

The red phosphor is excited by the light emitted from the light source 31 or the light emitted from at least one of the green phosphor or the yellow phosphor to emit red light. The red phosphor has the emission peak in the wavelength range of 600 nm to 650 nm. Examples of the red phosphor include $Sr_2Si_5N_8:Eu^{2+}$, $CaAlSiN_3:Eu^{2+}$, $SrAlSi_4N_7:Eu^{2+}$, $CaS:Eu^{2+}$, $La_2O_2S:Eu^{3+}$, $Y_3Mg_2(AlO_4)(SiO_4)_2:Ce^{3+}$.

As shown in FIG. 9, the optical filter 10 is disposed on the emission surface side of the LED module 30A. A part of the primary light L emitted from the light sources 31 passes through the wavelength conversion member 33 and the optical filter 10. In contrast, a part of the primary light L1 is reflected by the optical filter 10 as described above. The wavelength conversion member 33 may be excited by the primary light L1 but may be excited by reflected light R of the primary light L reflected by the optical filter 10. That is, the phosphors 34 may be excited by either the primary light L1 or the reflected light R to emit secondary light L2. Transmitted light T transmitted through the optical filter 10 is emitted from the LED module 30A.

When the wavelength conversion member 33 is excited by the reflected light R, the secondary light L2 shifted to the longer wavelength side with respect to the reflected light R is emitted. When the secondary light L2 has a wavelength that is not reflected by the optical filter 10, it passes through the optical filter 10 to be emitted to the outside. In this case, the reflected light R is reused and emitted to the outside, and thus the light emission efficiency of the LED module 30A is improved.

Figure 10A:
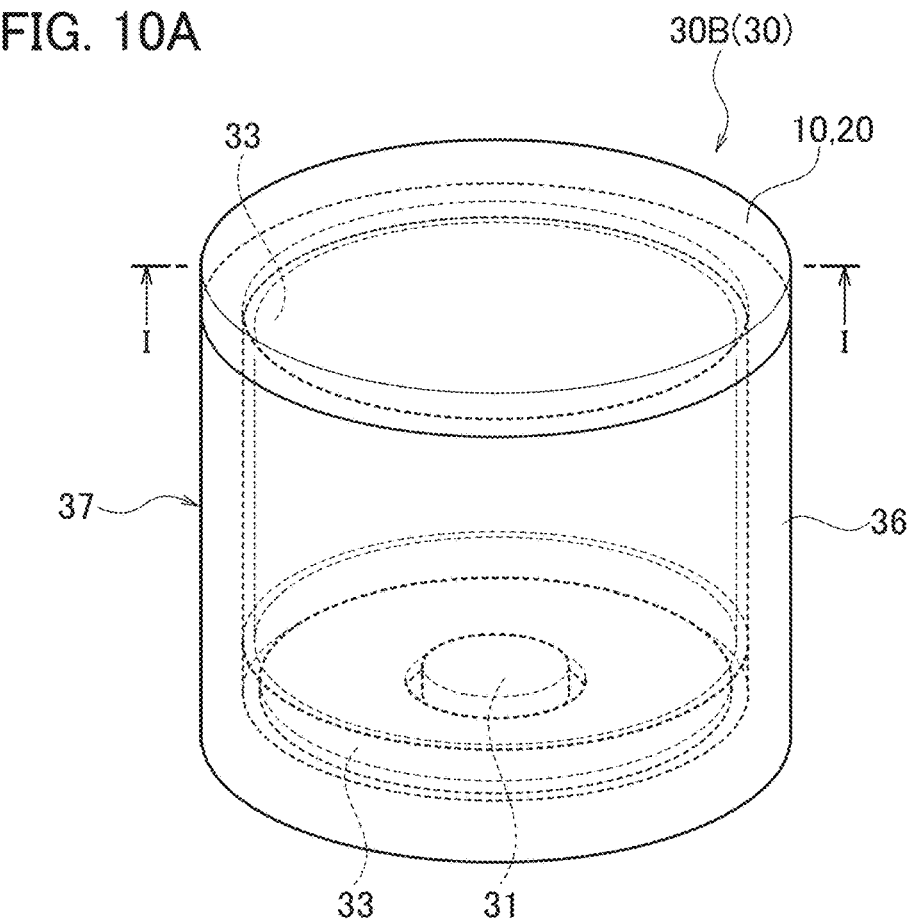
FIG. 10A is a perspective view of another example of the light emitting device according to the present embodiment.
Figure 10B:
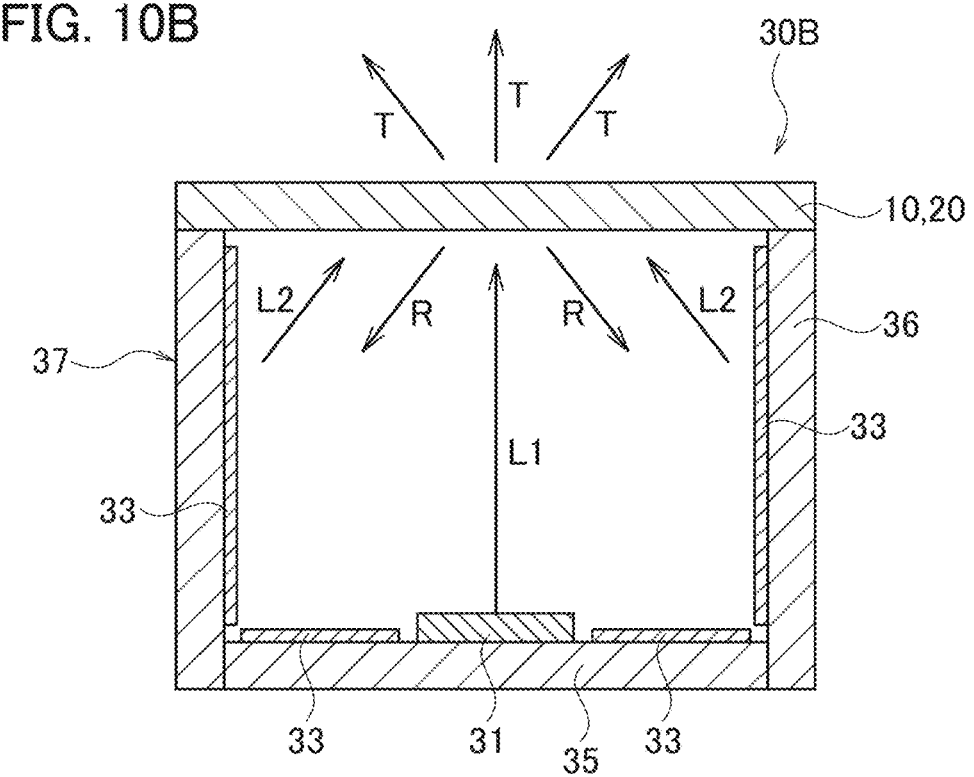
FIG. 10B is a cross-sectional view taken along line I-I in FIG. 10A.

Next, another example of the light emitting device 30 is described. FIGS. 10A and 10B show an LED module 30B as an example of the light emitting device 30. The same components as those of the LED module 30A are denoted by the same reference numerals, and duplicate descriptions are omitted. Also in the present embodiment, the light source 31 is a light emitting element including an LED element, but the present embodiment is not limited thereto.

As shown in FIGS. 10A and 10B, the LED module 30B includes a substantially cylindrical housing 37 and a light source 31. The housing 37 has a disk-shaped bottom wall 35 and a cylindrical side wall 36 connected to an edge of the bottom wall 35. In the LED module 30B, the optical filter 10 is disposed on an end of the side wall 36, opposite to the bottom wall 35. The LED module 30B has an internal space surrounded by the bottom wall 35, the side wall 36, and the optical filter 10.

The members constituting the bottom wall 35 and the side wall 36 are not limited, and any member made of a solid material may be used. As the members constituting the bottom wall 35 and the side wall 36, for example, a member containing at least one of a metal or a metal oxide may be used. Such a material is preferable because it efficiently exhausts heat generated by irradiation with scattered light.

The LED module 30B may further include a wavelength conversion member 33. In the present embodiment, the wavelength conversion member 33 is provided on each of internal space side surfaces of the bottom wall 35 and the side wall 36. The wavelength conversion member 33 provided on the bottom wall 35 is arranged to surround the periphery of the light source 31. Similarly to the LED module 30A, the wavelength conversion member 33 includes phosphors 34. The wavelength conversion member 33 is plate-like or film-like in shape.

As shown in FIG. 10B, the optical filter 10 is disposed on the emission surface side of the LED module 30B. A part of primary light L1 emitted from the light source 31 passes through the optical filter 10. In contrast, a part of the primary light L1 is reflected by the optical filter 10 as described above. The wavelength conversion member 33 may be excited by reflected light R of the primary light L1 reflected by the optical filter 10. That is, the phosphors 34 may be excited by either the primary light L1 or the reflected light R to emit secondary light L2.

When the wavelength conversion member 33 is excited by the reflected light R, the secondary light L2 shifted to the longer wavelength side with respect to the reflected light R is emitted. When the secondary light L2 has a wavelength that is not reflected by the optical filter 10, it passes through the optical filter 10 to be emitted to the outside. In this case, the reflected light R is reused and emitted to the outside, and thus the light emission efficiency of the LED module 30B is improved. Then, transmitted light T transmitted through the optical filter 10 is emitted from the LED module 30B.

Note that the light emitting device 30 exhibits the same effect as described above even when the optical filter 10 is replaced by the multiplex optical filter 20. The light emitting device 30 may further include a wavelength conversion member 33 that is excited by the reflected light R of the primary light L1 reflected by the multiplex optical filter 20.

[Illumination System]

Next, an illumination system 40 according to the present embodiment is described. The illumination system 40 according to the present embodiment includes a light emitting device 30.

Figure 11:
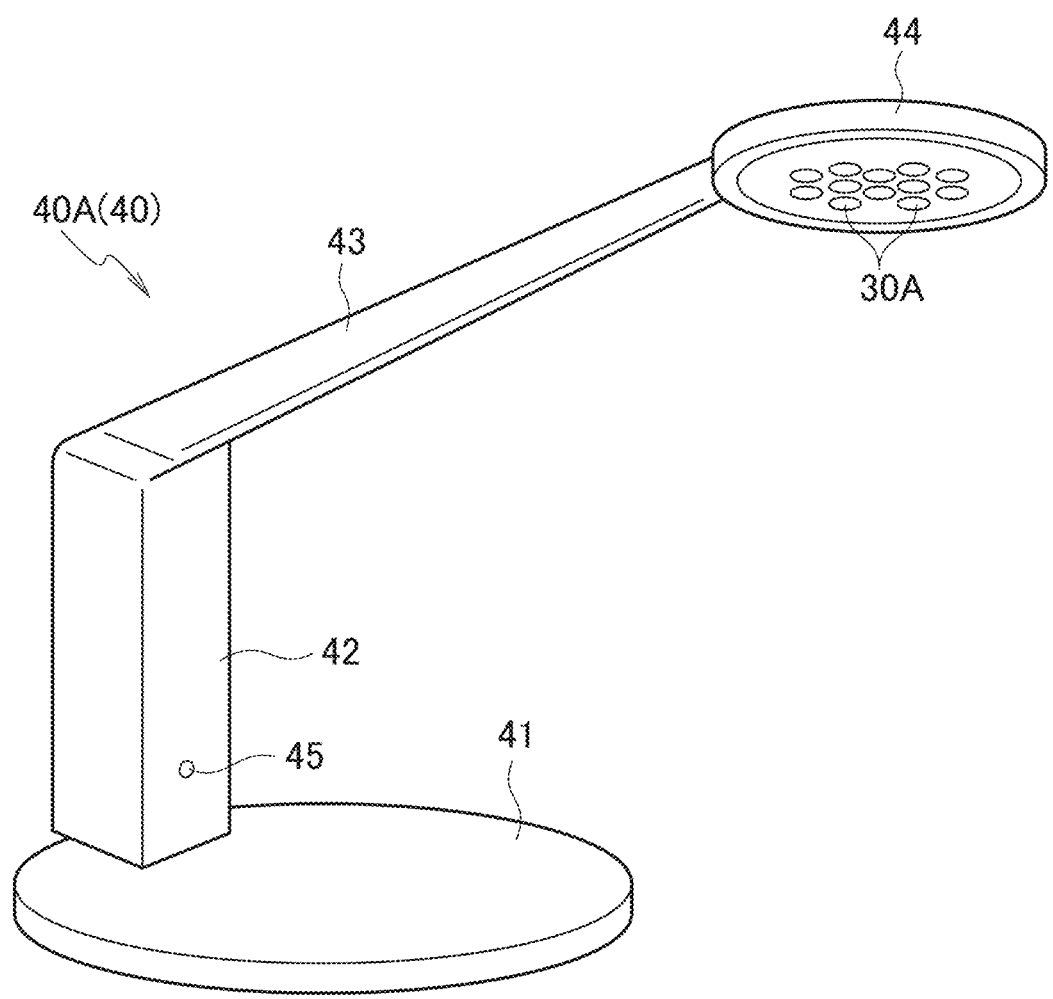
FIG. 11 is a perspective view of an example of an illumination system according to the present embodiment.

FIG. 11 shows a desk stand lamp 40A with an LED module 30A as an example of the illumination system 40. As shown in FIG. 11, the desk stand lamp 40A includes a substantially disc-shaped base 41 on which an illumination body 42 is mounted. The illumination body 42 includes an arm 43, and a lighting appliance 44 on the tip end of the arm 43 includes the LED module 30A. The illumination body 42 is provided with a switch 45, and the lighting state of the LED module 30A is changed by turning on and off the switch 45.

Figure 12A:
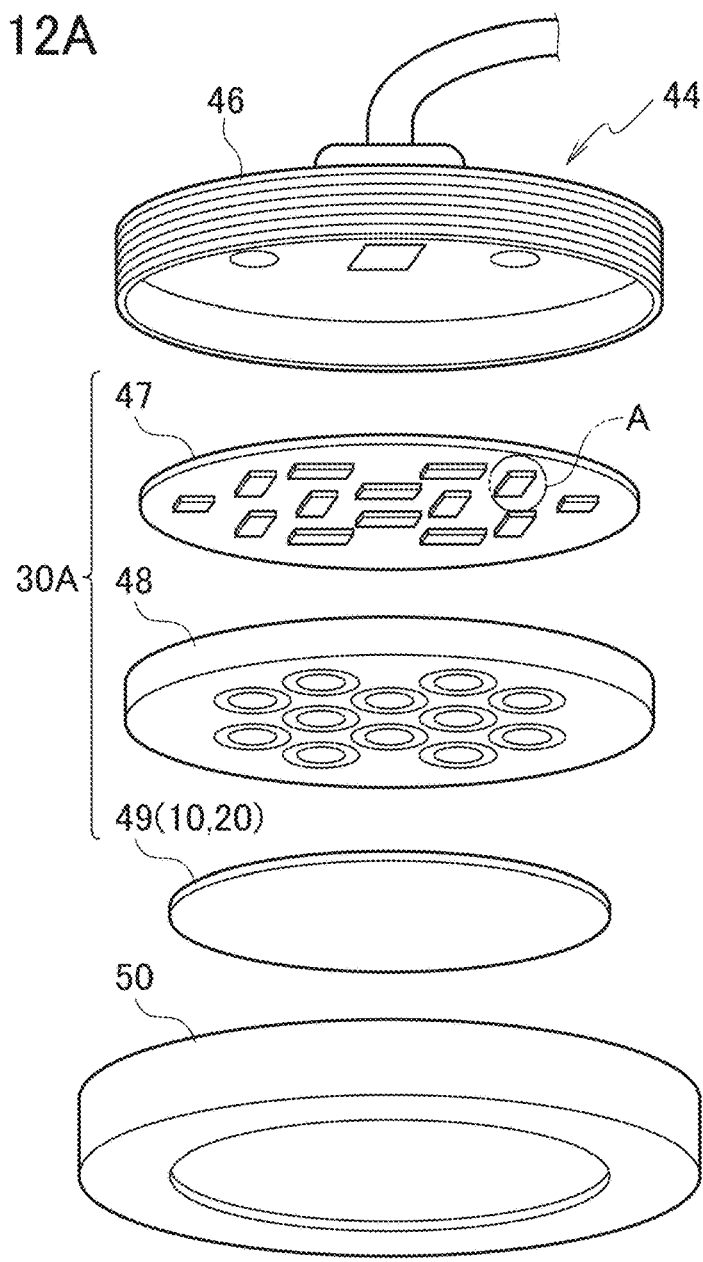
FIG. 12A is an exploded perspective view of a lighting appliance as an illumination system according to the present embodiment.
Figure 12B:
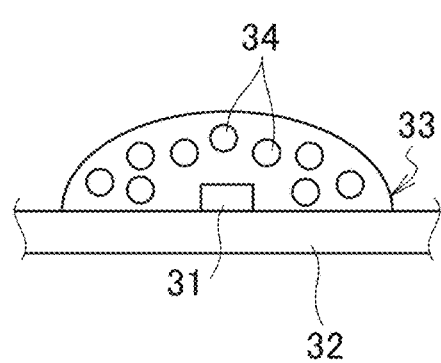
FIG. 12B is an enlarged schematic cross-sectional view of an area A of a light source unit of FIG. 12A.
Figure 13:
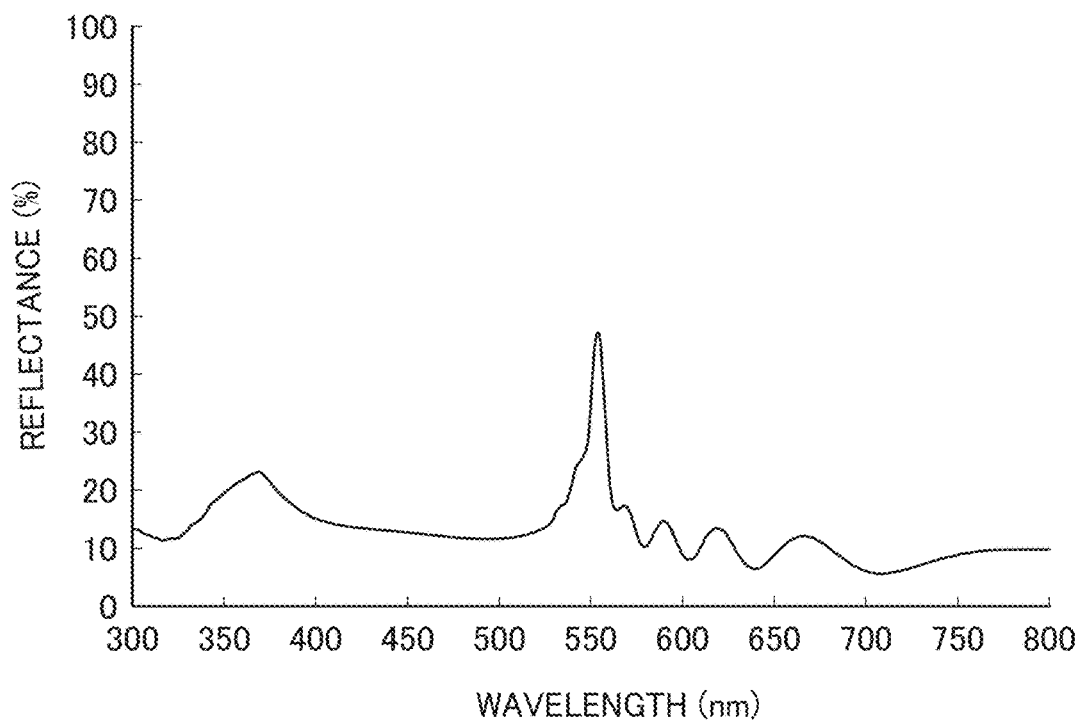
FIG. 13 is a graph illustrating a reflection spectrum of an optical filter of Example 1-1.
Figure 14:
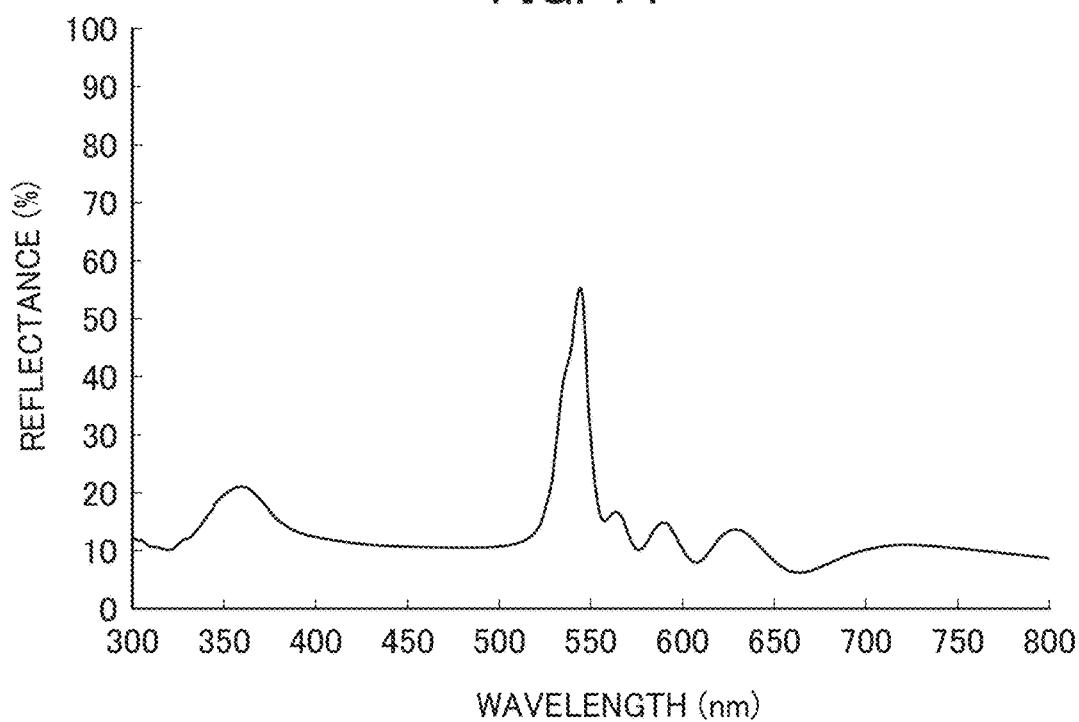
FIG. 14 is a graph illustrating a reflection spectrum of an optical filter of Example 1-2.
Figure 15:
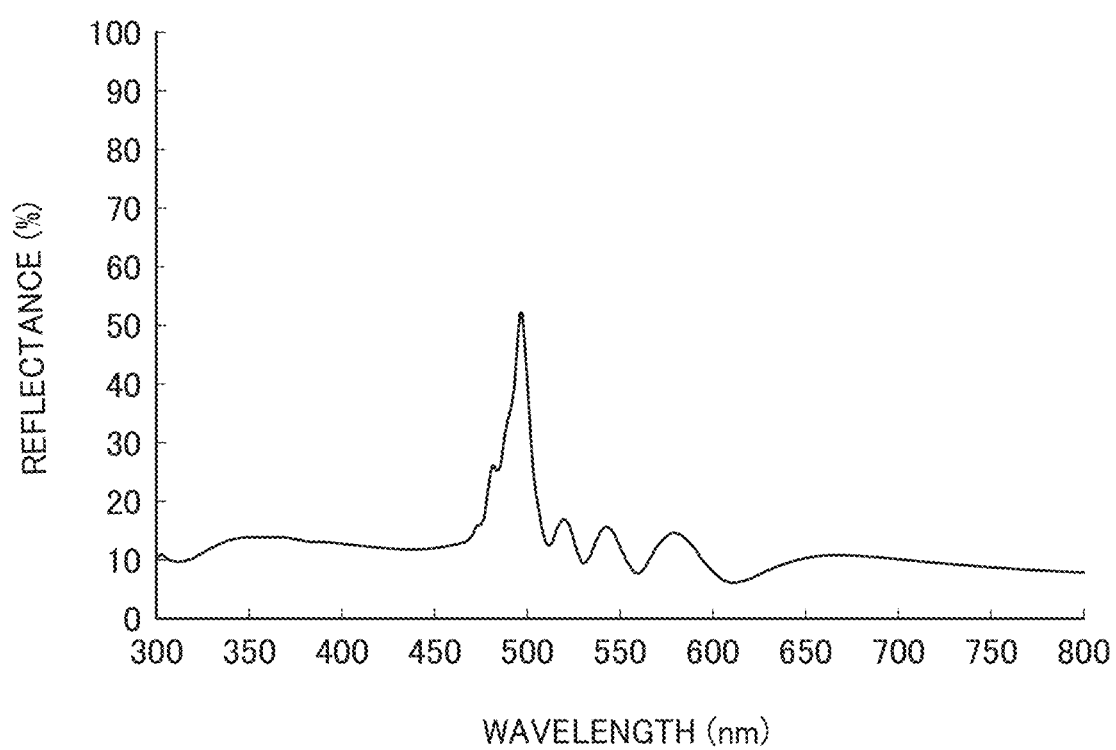
FIG. 15 is a graph illustrating a reflection spectrum of an optical filter of Example 1-3.
Figure 16:
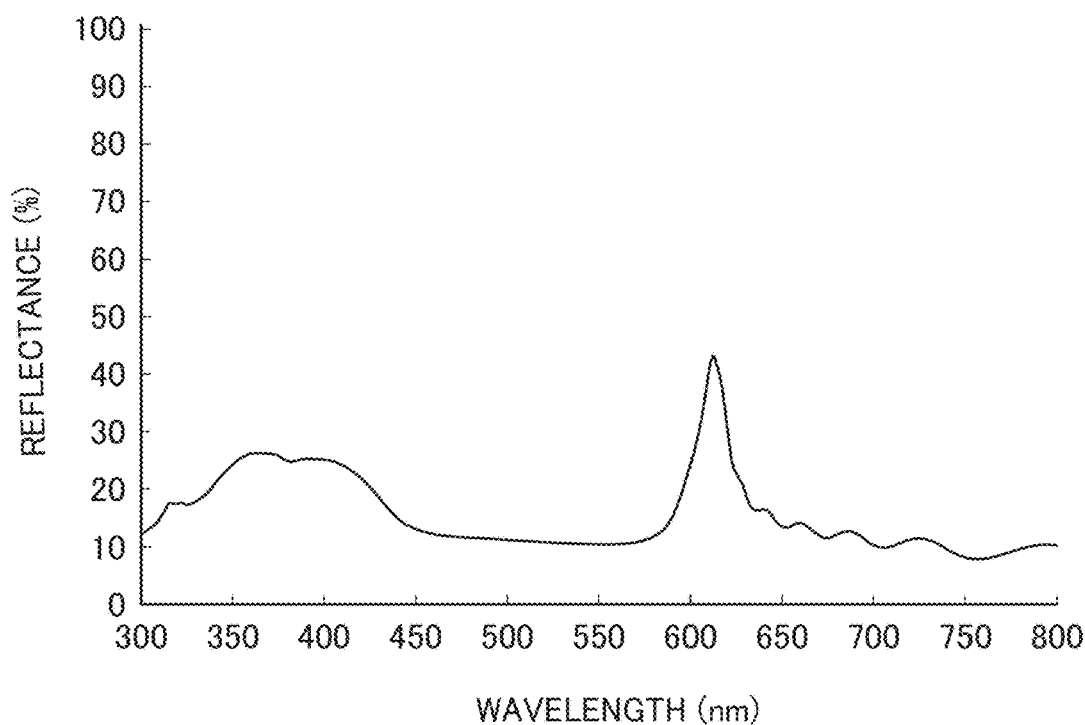
FIG. 16 is a graph illustrating a reflection spectrum of an optical filter of Example 1-4.

As shown in FIG. 12A, the lighting appliance 44 includes a substantially cylindrical base 46, a light source unit 47, an orientation control unit 48, a filter 49 including an optical filter 10, and a cover 50. In the present embodiment, the LED module 30A includes the light source unit 47 and the optical filter 10. As shown in FIG. 12B, the light source unit 47 includes a circuit board 32, a light source 31 mounted on the circuit board 32, and a wavelength conversion member 33 disposed on the circuit board 32 to cover the light source 31. The wavelength conversion member 33 includes phosphors 34. The orientation control unit 48 is used to control the light from the light source unit 47 to a desired light distribution and includes a lens in the present embodiment. However, the orientation control unit 48 may include a reflecting plate or a light guide plate according to the configuration of the illumination system 40 in addition to the lens.

As described above, the illumination system 40 according to the present embodiment uses the optical filter 10 excellent in durability and easy in wavelength control and thus emits light having a desired spectrum. That is, the illumination system 40 according to the present embodiment controls the wavelength with the optical filter 10 and prevents the attraction of insects, reduces the suppression of melatonin secretion, and clearly produces an irradiated body.

The illumination system 40 exhibits the same effect as described above when the optical filter 10 is replaced by the multiplex optical filter 20.

Hereinafter, the present embodiment is described in more detail with reference to examples and comparative examples, but the present embodiment is not limited to these examples.

Example 1

Example 1-1

First, in triethylene glycol dimethacrylate monomer ("NK ESTER 3G" manufactured by SHIN-NAKAMURA CHEMICAL CO., LTD.), silica particles (manufactured by NIPPON SHOKUBAI CO., LTD., average particle size: 180 nm) were added so that the content was 28% by volume. Next, under a room temperature (25° C.) condition, ultrasonic waves of 20 kHz were applied for 10 minutes to disperse the particles so that they could be arranged regularly in three dimensions in the binder. Thus, a dispersion liquid in which colloidal particles (silica particles) were uniformly dispersed in the monomer was obtained.

Next, 1.0% by mass of a photopolymerization initiator ("IRGACURE (registered trademark) 1173" manufactured by BASF) was added to the dispersion liquid obtained as described above. The dispersion liquid was then applied under a room temperature (25° C.) condition to a glass substrate of 200 mm square and 1.0 mm thick by using a bar coater. By irradiating the dispersion liquid-coated substrate with ultraviolet light to polymerize monomers, an optical filter in which a colloidal crystal layer having a thickness of 30 μm was formed on the glass substrate was obtained.

Example 1-2

An optical filter was made in the same manner as in Example 1-1 except that the content of silica particles was changed to 30% by volume.

Example 1-3

An optical filter was made in the same manner as in Example 1-1 except that the average particle size of the silica particles was changed to 150 nm.

Example 1-4

An optical filter was made in the same manner as in Example 1-1 except that the average particle size of the silica particles was changed to 200 nm.

[Evaluation]

(Reflection Spectrum)

Figure 17:
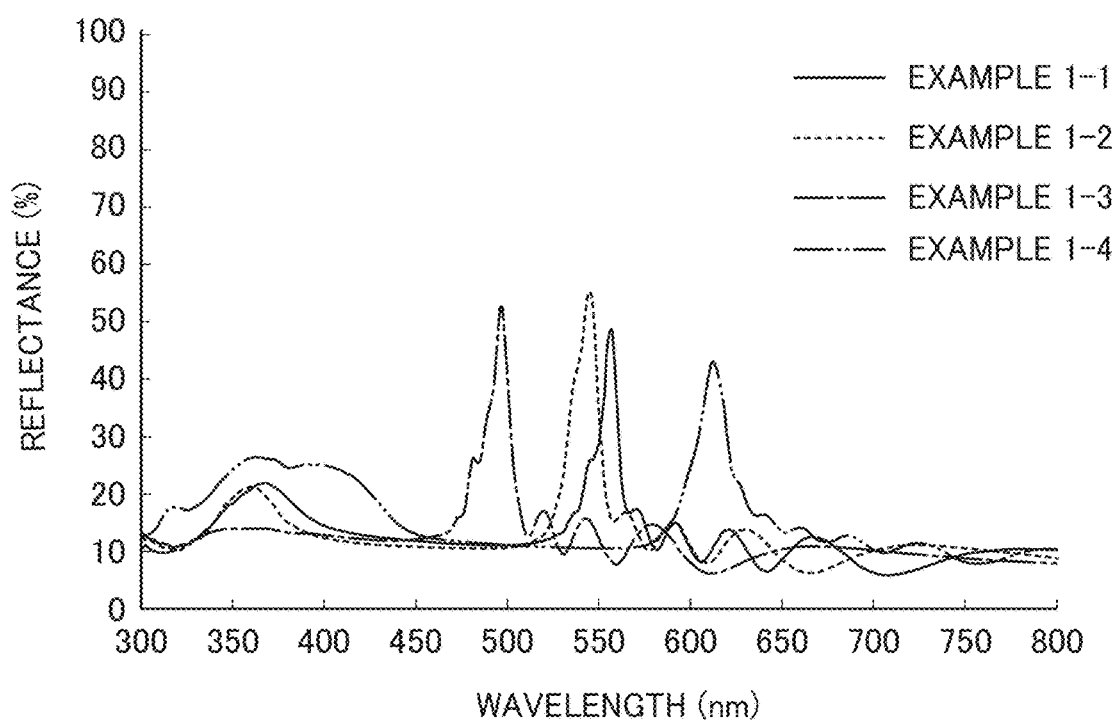
FIG. 17 is a graph illustrating superimposed reflection spectra in Examples 1-1 to 1-4.

The reflection spectrum of the optical filter made as described above was measured using an ultraviolet-visible spectrophotometer (UV-2600 manufactured by SHIMADZU CORPORATION). The reflection spectra were measured in the wavelength range of 300 nm to 800 nm. FIGS. 13 to 16 show the reflection spectra of Examples 1-1 to 1-4, respectively. FIG. 17 shows the superimposed reflection spectra of Examples 1-1 to 1-4.

The reflection spectrum of Example 1-1 has a peak with the maximum reflectance of about 49% in the vicinity of 540 nm to 570 nm. The reflection spectrum of Example 1-2 has a peak with the maximum reflectance of about 55% in the vicinity of 530 nm to 560 nm. The reflection spectrum of Example 1-3 has a peak with the maximum reflectance of about 52% in the vicinity of 480 nm to 510 nm. The reflection spectrum of Example 1-4 has a peak with the maximum reflectance of about 43% in the vicinity of 580 nm to 630 nm. The full width at half maximum of the peak of Example 1-1 was 10 nm, that of Example 1-2 was 16 nm, that of Example 1-3 was 14 nm, and that of Example 1-4 was 19 nm.

As described above, in the present embodiment, the reflection spectrum changes only by changing either one of the content of the particles or the average particle size of the particles without using a dye. Such a change in the reflection spectrum is considered to be due to Bragg reflection by the colloidal crystal layer. Accordingly, given that the change in the reflection spectrum is due to the Bragg reflection, it is expected that the reflection spectrum also changes depending on the material of the particles, the material of the binder, the layer thickness of the colloidal crystal layer, the center-to-center distance of the particles, or the like.

Example 2

Example 2-1

First, in triethylene glycol dimethacrylate monomer ("NK ESTER 3G" manufactured by SHIN-NAKAMURA CHEMICAL CO., LTD.), silica particles (manufactured by NIPPON SHOKUBAI CO., LTD., average particle size: 180 nm) were added so that the content was 32% by volume. Next, under a room temperature (25° C.) condition, ultrasonic waves of 20 kHz were applied for 10 minutes to disperse the particles so that they could be arranged regularly in three dimensions in the binder. Thus, a dispersion liquid in which colloidal particles (silica particles) were uniformly dispersed in the monomer was obtained.

Next, 1.0% by mass of a photopolymerization initiator ("IRGACURE (registered trademark) 1173" manufactured by BASF) was added to the dispersion liquid obtained as described above. The dispersion liquid was then applied under a room temperature (25° C.) condition to a glass substrate of 200 mm square and 1.0 mm thick by using a bar coater. In this case, a bar coater with #18 count was used. By irradiating the obtained coating film with ultraviolet light to polymerize monomers, a first colloidal crystal layer was formed on the glass substrate.

Further, the dispersion liquid was applied to the surface of the first colloidal crystal layer by using a bar coater under a room temperature (25° C.) condition. In this case, a bar coater with #18 count was used. By irradiating the obtained coating film with ultraviolet light to polymerize monomers, a second colloidal crystal layer was formed on the surface of the first colloidal crystal layer. Thus, the multiplex optical filter according to the present example was obtained.

Example 2-2

First, in triethylene glycol dimethacrylate monomer ("NK ESTER 3G" manufactured by SHIN-NAKAMURA CHEMICAL CO., LTD.), silica particles (manufactured by NIPPON SHOKUBAI CO., LTD., average particle size: 150 nm) were added so that the content was 34% by volume. Next, under a room temperature (25° C.) condition, ultrasonic waves of 20 kHz were applied for 10 minutes to disperse the particles so that they could be arranged regularly in three dimensions in the binder. Thus, a dispersion liquid in which colloidal particles (silica particles) were uniformly dispersed in the monomer was obtained. Next, a first dispersion liquid was prepared by adding 1.0% by mass of a photopolymerization initiator ("IRGACURE (registered trademark) 1173" manufactured by BASF) to the obtained dispersion liquid.

Further, as in Example 2-1, a second dispersion liquid was prepared by adding 32% by volume of silica particles (average particle size: 180 nm) and 1.0% by mass of a photopolymerization initiator to triethylene glycol dimethacrylate monomer. As in Example 2-1, "NK ESTER 3G" was used as the triethylene glycol dimethacrylate monomer, and "IRGACURE (registered trademark) 1173" was used as the photopolymerization initiator.

The first dispersion liquid was then applied under a room temperature (25° C.) condition to a glass substrate of 200 mm square and 1.0 mm thick by using a bar coater. In this case, a bar coater with #18 count was used. By irradiating the obtained coating film with ultraviolet light to polymerize monomers, a first colloidal crystal layer was formed on the glass substrate.

Further, the second dispersion liquid was applied to the surface of the first colloidal crystal layer by using a bar coater under a room temperature (25° C.) condition. In this case, a bar coater with #18 count was used. By irradiating the obtained coating film with ultraviolet light to polymerize monomers, a second colloidal crystal layer was formed on the surface of the first colloidal crystal layer. Thus, the multiplex optical filter according to the present example was obtained.

Reference Example 2-1

As in Example 2-1, a dispersion liquid was prepared by adding 32% by volume of silica particles (average particle size: 180 nm) and 1.0% by mass of a photopolymerization initiator to triethylene glycol dimethacrylate monomer. As in Example 2-1, "NK ESTER 3G" was used as the triethylene glycol dimethacrylate monomer, and "IRGACURE (registered trademark) 1173" was used as the photopolymerization initiator.

Next, the dispersion liquid was applied under a room temperature (25° C.) condition to a glass substrate of 200 mm square and 1.0 mm thick by using a bar coater. In this case, a bar coater with #18 count was used. By irradiating the obtained coating film with ultraviolet light to polymerize monomers, a colloidal crystal layer was formed on the glass substrate. Thus, the optical filter according to the present example was obtained.

[Evaluation]

(Reflection Spectrum)

Figure 18:
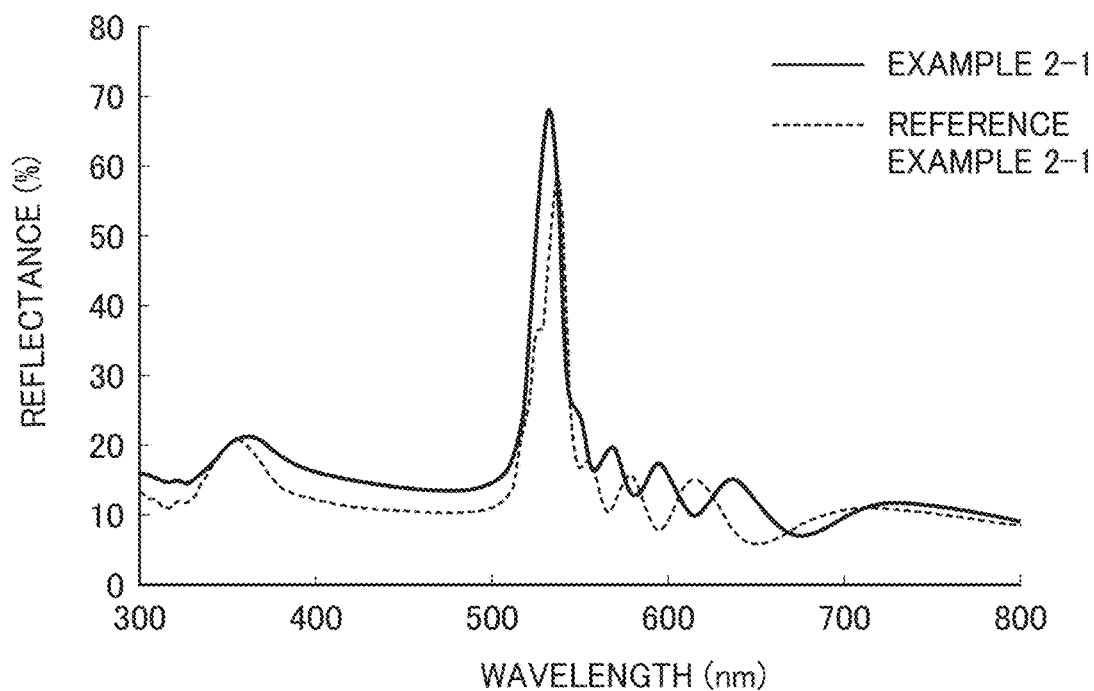
FIG. 18 is a graph illustrating reflection spectra of a multiplex optical filter of Example 2-1 and an optical filter of Reference Example 2-1.
Figure 19:
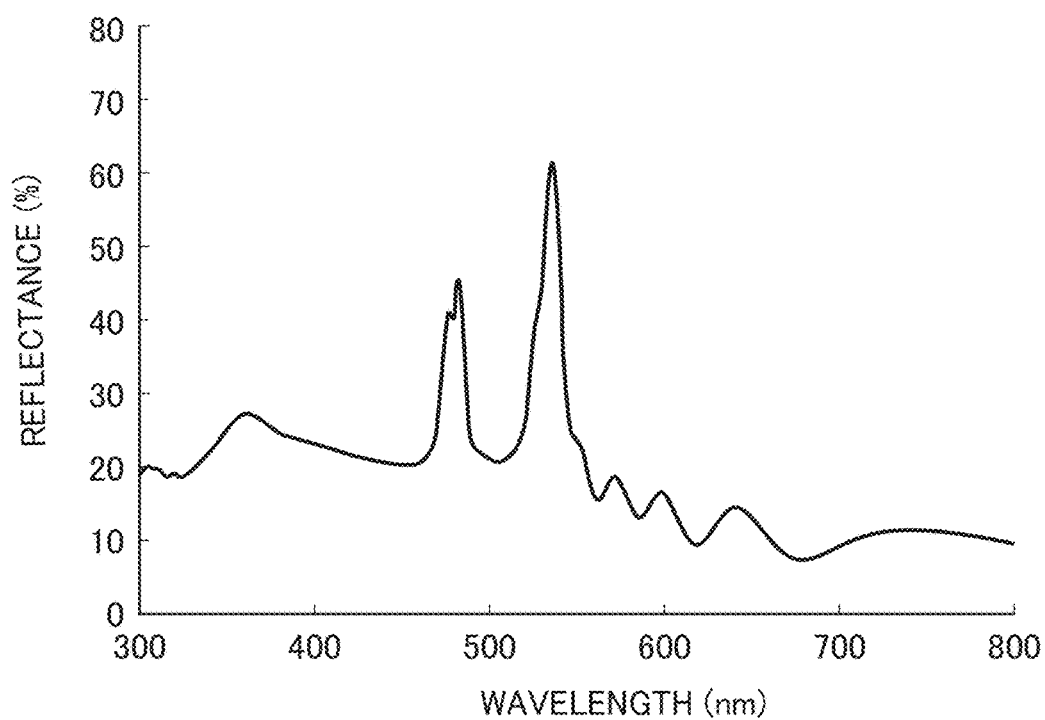
FIG. 19 is a graph illustrating a reflection spectrum of a multiplex optical filter of Example 2-2.

The reflection spectra of the multiplex optical filters of Example 2-1 and Example 2-2 and the optical filter of Reference Example 2-1 made as described above were measured using an ultraviolet-visible spectrophotometer (UV-2600 manufactured by SHIMADZU CORPORATION). The reflection spectra were measured in the wavelength range of 300 nm to 800 nm. FIG. 18 shows the reflection spectrum of Example 2-1, and FIG. 19 shows the reflection spectrum of Example 2-2. FIG. 18 also shows the reflection spectrum of Reference Example 2-1.

As shown in FIG. 18, the reflection spectrum of Example 2-1 has a peak with the maximum reflectance of about 68% in the vicinity of 520 nm to 540 nm. The reflection spectrum of Reference Example 2-1 has a peak with the maximum reflectance of about 58% in the vicinity of 530 nm to 550 nm. This shows that a filter having a high reflectance is obtained by stacking optical filters having almost the same regular arrangement structure.

As shown in FIG. 19, the reflection spectrum of Example 2-2 has a peak with the maximum reflectance of about 46% in the vicinity of 470 nm to 490 nm, and a peak with the maximum reflectance of about 62% in the vicinity of 530 nm to 550 nm. This shows that a filter reflecting light of two wavelengths is obtained by stacking optical filters having different regular arrangement structures from each other.

Although the present embodiment has been described above, the present embodiment is not limited thereto, and various modifications can be made within the scope of the gist according to the present embodiment.

The entire contents of Japanese Patent Application No. 2018-100776 (application date: May 25, 2018) and Japanese Patent Application No. 2018-213637 (application date: Nov. 14, 2018) are incorporated herein by reference.

INDUSTRIAL APPLICABILITY

The present disclosure provides an optical filter and a multiplex optical filter that are excellent in durability and easy in wavelength control, and a light emitting device and an illumination system using the same.

REFERENCE SIGNS LIST

10 OPTICAL FILTER
12, 12A, 12B, 12C COLLOIDAL CRYSTAL LAYER
14 PARTICLES
16 BINDER
18 SUBSTRATE
20, 20A, 20B, 20C, 20D, 20E, 20F MULTIPLEX OPTICAL FILTER
30 LIGHT EMITTING DEVICE
31 LIGHT SOURCE
33 WAVELENGTH CONVERSION MEMBER
40 ILLUMINATION SYSTEM
L1 PRIMARY LIGHT
R REFLECTED LIGHT

The invention claimed is:

1. An optical filter, comprising:
   a colloidal crystal layer comprising: a plurality of particles including at least one of an inorganic material or a resin material; and a binder disposed between the plurality of particles, the binder fixing the plurality of particles relative to each other such that an average distance between the plurality of particles remains constant,
   wherein the optical filter is configured to reflect a part of light in a wavelength range of 300 nm or more and less than 800 nm.

2. The optical filter according to claim 1, wherein a maximum reflectance in the wavelength range of 300 nm or more and less than 800 nm is 20% or more and less than 100%.

3. The optical filter according to claim 1, wherein a full width at half maximum of a peak of a reflection spectrum, the peak having a maximum reflectance in the wavelength range of 300 nm or more and less than 800 nm, is 5 nm to 100 nm.

4. The optical filter according to claim 1, further comprising:
   a substrate that is translucent,
   wherein the colloidal crystal layer is on the substrate.

5. A multiplex optical filter, comprising:
   multiple optical filters, each of which being the optical filter according to claim 1.

6. The multiplex optical filter according to claim 5, wherein two optical filters selected from the multiple optical filters have a difference of more than 10 nm between a peak wavelength of a reflection spectrum of one optical filter and a peak wavelength of a reflection spectrum of the other optical filter.

7. The multiplex optical filter according to claim 5, wherein two optical filters selected from the multiple optical filters have a difference of 10 nm or less between a peak wavelength of a reflection spectrum of one optical filter and a peak wavelength of a reflection spectrum of the other optical filter.

8. The multiplex optical filter according to claim 5, further comprising:
   a substrate that is translucent,
   wherein the multiple optical filters are on the substrate.

9. The multiplex optical filter according to claim 8, wherein the multiple optical filters are on both sides of the substrate.

10. The multiplex optical filter according to claim 5, wherein a reflection spectrum includes two or more peaks, each of which having a maximum reflectance of 20% or more and less than 100% in the wavelength range of 300 nm or more and less than 800 nm.

11. The multiplex optical filter according to claim 10, wherein a full width at half maximum of each of the peaks of the reflection spectrum is 5 nm to 100 nm.

12. A light emitting device, comprising:
the optical filter according to claim 1; and
a light source,
wherein the optical filter is configured to transmit a part of primary light emitted from the light source.

13. The light emitting device according to claim 12, further comprising:
a wavelength conversion member configured to be excited by reflected light of the primary light reflected by the optical filter.

14. A light emitting device, comprising:
the multiplex optical filter according to claim 5; and
a light source,
wherein the multiplex optical filter is configured to transmit a part of primary light emitted from the light source.

15. The light emitting device according to claim 14, further comprising:
a wavelength conversion member configured to be excited by reflected light of the primary light reflected by the multiplex optical filter.

16. An illumination system, comprising:
the light emitting device according to claim 12.

17. The optical filter according to claim 1, wherein an average value of a center-to-center distance of the particles is 100 nm to 380 nm.

18. The optical filter according to claim 1, wherein an average value of a center-to-center distance of the particles is 140 nm to 310 nm.

* * * * *